US009977886B2

(12) United States Patent
Simmonds

(10) Patent No.: US 9,977,886 B2
(45) Date of Patent: May 22, 2018

(54) METHODS, APPARATUS AND COMPUTER PROGRAMS FOR ENTITY AUTHENTICATION

(71) Applicant: Paul Simmonds, Hedgerley (GB)

(72) Inventor: Paul Simmonds, Hedgerley (GB)

(*) Notice: Subject to any disclaimer, the term of this patent is extended or adjusted under 35 U.S.C. 154(b) by 79 days.

(21) Appl. No.: 14/831,727

(22) Filed: Aug. 20, 2015

(65) Prior Publication Data

US 2015/0356287 A1 Dec. 10, 2015

Related U.S. Application Data

(63) Continuation of application No. PCT/GB2014/050503, filed on Feb. 20, 2014.

(60) Provisional application No. 61/767,916, filed on Feb. 22, 2013.

(51) Int. Cl.
G06F 21/32 (2013.01)
G06F 21/44 (2013.01)
G06F 21/31 (2013.01)
G06F 21/34 (2013.01)

(52) U.S. Cl.
CPC .............. *G06F 21/32* (2013.01); *G06F 21/31* (2013.01); *G06F 21/34* (2013.01); *G06F 21/445* (2013.01); *G06F 2221/0735* (2013.01)

(58) Field of Classification Search
CPC .................................. G06F 21/31; G06F 21/34
USPC ......................................................... 726/2, 28
See application file for complete search history.

(56) References Cited

U.S. PATENT DOCUMENTS

| 6,182,076 | B1 | 1/2001 | Yu et al. | |
| 8,667,265 | B1* | 3/2014 | Hamlet | H04L 9/0866 326/80 |
| 2006/0200855 | A1* | 9/2006 | Willis | H04L 9/3213 726/2 |
| 2006/0242427 | A1 | 10/2006 | Ruzyski et al. | |
| 2006/0281442 | A1* | 12/2006 | Lee | H04L 9/3273 455/412.2 |
| 2007/0124597 | A1 | 5/2007 | Bedingfield, Sr. | |
| 2008/0250495 | A1 | 10/2008 | Hayashi | |
| 2011/0314287 | A1* | 12/2011 | Escott | H04L 63/061 713/171 |
| 2011/0314531 | A1 | 12/2011 | Kim et al. | |
| 2013/0007891 | A1* | 1/2013 | Mogaki | G06F 21/62 726/27 |

(Continued)

FOREIGN PATENT DOCUMENTS

WO 20070115209 A2 10/2007
WO 2014128476 A2 8/2014

OTHER PUBLICATIONS

Abdulwahid, "Continuous and transparent multimodal authentication: reviewing the state of the art", Nov. 26, 2015, Cluster Comput, pp. 455-474.*

(Continued)

*Primary Examiner* — Thanhnga B Truong
*Assistant Examiner* — Gregory Lane
(74) *Attorney, Agent, or Firm* — EIP US LLP

(57) ABSTRACT

An identity of an entity (120) is authenticated at an authentication device (110) using at least one authentication process. The result of the authentication is indicated. The authentication result identifies at least the identity of the entity (120) and the at least one authentication process used to authenticate the identity of the entity (120).

17 Claims, 13 Drawing Sheets

(56) References Cited

U.S. PATENT DOCUMENTS

2013/0091552 A1* 4/2013 Cheng ................... H04W 12/06
   726/4

OTHER PUBLICATIONS

International Search Report and Written Opinion dated Sep. 23, 2014 for PCT Application No. PCT/GB2014/050503.

* cited by examiner

METHODS, APPARATUS AND COMPUTER PROGRAMS FOR ENTITY AUTHENTICATION

CROSS-REFERENCE TO RELATED APPLICATIONS

This application is a continuation of International Application No. PCT/GB2014/050503, filed Feb. 20, 2014, which claims the benefit of U.S. Provisional Application No. 61/767,916, filed on Feb. 22, 2013. Each of the above-referenced patent applications is incorporated by reference in its entirety.

BACKGROUND OF THE INVENTION

Field of the Invention

The present invention relates to methods, apparatus and computer programs for authentication of an entity.

Description of the Related Technology

It is often necessary for a relying party to authenticate an entity with which they are interacting. For example, an online merchant may need to authenticate a user before allowing the user access to certain services offered by the online merchant. As another example, a user may need to logon to a remote network, such as a corporate network for the user's employer or the like. As another example, a user may need to be authenticated even when personally present in front of the relying party and the communications between the user and the relying party do not take place over a network.

There are various ways in which the relying party can authenticate the user. One way is to request the user to provide a username and password. If the provided username and password match a username and password combination associated with an existing account or the like held with the relying party, the relying party allows access to services associated with the existing account.

Although it is important to perform authentication in such circumstances, communicating a username and password from the user to the relying party can have serious security implications, for example if the username and password are intercepted while being communicated. In any event, it is possible for the username and password to be "stolen" or even guessed by a third party, and may be subject to "brute force" attacks where a third party simply tries many different possible combinations of username and password (typically using a computer for this purpose).

SUMMARY

According to a first aspect of the invention, there is provided a method of authenticating an entity, the method comprising: authenticating at an authentication device an identity of the entity using at least one authentication process; and causing an authentication result to be indicated, the authentication result identifying at least the identity of the entity and the at least one authentication process used to authenticate the identity of the entity.

Performing authentication in this way enables a relying party to make a risk-based decision on the authentication performed at the authentication device. It also helps to enhance privacy by performing the authentication locally at the authentication device. In an example, the authentication result indicates a confirmation of the identity of the entity. The authentication result may also identify the type and thus function of the authentication device.

In an embodiment, causing the authentication result to be indicated comprises causing the authentication result to be indicated to an intermediary, the intermediary being intermediate the authentication device and a relying party and being arranged to indicate data relating to the entity to the relying party dependent on the authentication result. This enables the authentication device to operate behind the intermediary to enhance privacy and security.

In an embodiment, the method comprises causing data identifying one or more attributes associated with the authentication device to be indicated. This enables a relying party to make a more considered risk-based decision on the authentication performed at the authentication device by allowing the relying party to take account of attributes of the authentication device performing the authentication.

In an embodiment, the one or more attributes associated with the authentication device comprise one or more of: a manufacturer of the authentication device; a model of the authentication device; capability of the authentication device to perform one or more authentication processes; and capability of the authentication device to perform one or more functions associated with authentication. This provides a relying party with pertinent information to make a more considered risk-based decision on the authentication performed at the authentication device.

In an embodiment, the method comprises causing data identifying one or more attributes associated with an issuer of the authentication device to be indicated. This provides a relying party with pertinent information to make a more considered a risk-based decision on the authentication performed at the authentication device.

In an embodiment, the entity has one or more personas, a persona being associated with one or more attributes of the entity, and the method comprises storing a link between the entity and the one or more personas in the authentication device. This allows the entity to use the authentication device in relation to different personas of the entity.

In an embodiment, the entity has a plurality of different personas, a persona being associated with one or more attributes of the entity, and the method comprises: selecting a persona of the entity from the plurality of different personas; and performing the authenticating of the identity of the entity in relation to the selected persona of the entity. This allows the entity to manage multiple personas conveniently, using the authentication device.

In an embodiment, performing the authenticating of the identity of the entity in relation to the selected persona of the entity comprises: receiving one or more authentication credentials for use in said authenticating; comparing the received one or more authentication credentials with pre-stored authentication data associated with the selected persona of the entity; and determining a result of the authentication in relation to the selected persona of the entity based at least in part on said comparing. The one or more authentication credentials are received by the authentication device.

In an embodiment, data identifying different ones of the plurality of different persona of the entity is stored in the authentication device. This allows the entity to use the authentication device in relation to different personas of the entity.

In an embodiment, a plurality of different sets of cryptographic keys are stored in the authentication device, each set of cryptographic keys relating to a different persona of the entity. This allows the entity to enhance security in relation to its personas by each individual persona having different cryptographic keys.

In an embodiment, the method comprises: receiving one or more authentication credentials for use in said authenticating; comparing the received one or more authentication credentials with pre-stored authentication data associated with the identity of the entity; and determining a result of the authentication based at least in part on said comparing. This enhances privacy by locally receiving the one or more authentication credentials.

In an embodiment, the method comprises: receiving the authentication data associated with the identity of the entity prior to said receiving of the one or more authentication credentials; and storing the received authentication data. This enhances privacy by locally receiving and storing the authentication data that is used to authenticate the identity of the entity.

In an embodiment, the method comprises selecting the at least one authentication process used to authenticate the identity of the entity based at least in part on authentication process selection data received from the entity. This enhances privacy in that the entity has at least some control over how authentication is performed. For example, the entity may allow different authentication processes to be used in relation to different persona of the entity and/or different relying parties.

In an embodiment, the method comprises selecting the at least one authentication process used to authenticate the identity of the entity based at least in part on authentication process selection data received from a relying party. This facilitates making the risk-based decision on the authentication performed at the authentication device since the relying party has at least some control over the authentication of the identity of the entity.

In an embodiment, the method comprises receiving a request for additional authentication of the identity of the entity to be carried out; re-authenticating the identity of the entity using at least one additional authentication process; and causing an additional authentication result to be indicated for use by the relying party, the additional authentication result identifying a result of the re-authentication. Performing authentication in this way enables the relying party to request additional authentication of the identity of the entity. The relying party may request the additional authentication if, for example, it decides that it needs real-time authentication of the entity performed at the authentication device using the at least one authentication process.

According to a second aspect of the invention, there is provided a method for use in authenticating an entity, the method comprising: receiving an authentication result identifying at least an identity of the entity and at least one authentication process used to authenticate the identity of the entity at an authentication device; and determining whether or not to accept the authentication of the identity of the entity by the authentication device based at least in part on the identified at least one authentication process used by the authentication device to authenticate the identity of the entity.

In an embodiment, the method comprises: selecting one or more authentication processes to be used by the authentication device to authenticate the identity of the entity; and causing authentication process selection data to be indicated to the authentication device, the authentication process selection data identifying the selected one or more authentication processes.

In an embodiment, the method comprises causing a request for additional authentication of the identity of the entity to be carried out to be indicated to the authentication device; receiving an additional authentication result, the additional authentication result identifying a result of the additional authentication; and determining whether or not to accept the additional authentication of the identity of the entity by the authentication device based at least in part on the result of the additional authentication.

According to a third aspect of the invention, there is provided an authentication device for authenticating an entity, the authentication device being arranged to: authenticate an identity of the entity using at least one authentication process; and cause an authentication result to be indicated, the authentication result identifying at least the identity of the entity and the at least one authentication process used to authenticate the identity of the entity.

According to a fourth aspect of the invention, there is provided a device for use in authenticating an entity, the device being arranged to: identify, from an authentication result received from an authentication device, at least an identity of the entity and at least one authentication process used to authenticate the identity of the entity at the authentication device; and determine whether or not to accept an authentication of the identity of the entity by the authentication device based at least in part on the identified at least one authentication process used by the authentication device to authenticate the identity of the entity.

According to a fifth aspect of the invention, there is provided a computer program arranged when executed to perform a method of authenticating an entity, the method comprising: authenticating, at an authentication device, an identity of the entity using at least one authentication process; and causing an authentication result to be indicated, the authentication result identifying at least the identity of the entity and the at least one authentication process used to authenticate the identity of the entity.

According to a sixth aspect of the invention, there is provided a computer program arranged when executed to perform a method for use in authenticating an entity, the method comprising: receiving an authentication result identifying at least an identity of the entity and at least one authentication process used to authenticate the identity of the entity at an authentication device; and determining whether or not to accept the authentication of the identity of the entity by the authentication device based at least in part on the identified at least one authentication process used by the authentication device to authenticate the identity of the entity.

According to a seventh aspect of the invention, there is provided a method of setting up an authentication device for use in authenticating an entity, the method comprising: creating a digital persona for the entity; storing the digital persona; and binding the authentication device to the digital persona by creating a link in the authentication device between the digital persona and the entity, whereby the authentication device can cause an authentication result to be indicated, the authentication result identifying at least the identity of the entity and at least one authentication process used to authenticate the identity of the entity in relation to the digital persona.

According to an eighth aspect of the invention, there is provided apparatus for setting up an authentication device for use in authenticating an entity, the apparatus being arranged to: create a digital persona for the entity; cause the digital persona to be stored; and cause the authentication device to be bound to the digital persona by causing a link between the digital persona and the entity to be created in the authentication device, whereby the authentication device can cause an authentication result to be indicated, the authentication result identifying at least the identity of the entity and at least one authentication process used to authenticate the identity of the entity in relation to the digital persona.

There may be provided a non-transitory computer-readable storage medium comprising a set of computer-readable instructions stored thereon, which, when executed by a processing system, cause the processing system to carry out any of the methods as described above.

The devices described above may include a processing system which may comprise at least one processor and at least one memory including computer program instructions, the at least one memory and the computer program instructions being configured to, with the at least one processor, cause the devices at least to perform as described above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
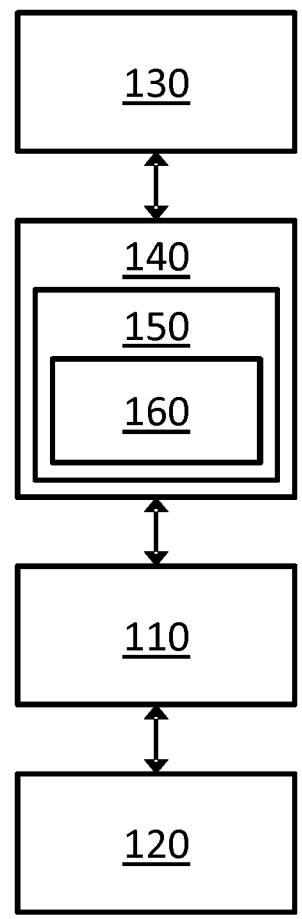
FIG. 1 shows a block diagram of an example of an environment in which authentication is carried out in accordance with an embodiment of the present invention.

Referring to FIG. 1, there is shown schematically an example of an authentication device 110, which is associated with an entity 120 that possesses the authentication device 110, a relying party 130 and an intermediary 140.

The intermediary 140 is intermediate the authentication device 110 and the relying party 130. The intermediary 140 includes a data store 150 that stores data 160. In an example, the data 160 stored in the data store 150 is or includes data associated with the entity 120. Examples of such data 160 are described in more detail below.

The entity 120 may take various different forms. Examples of the entity 120 include a (natural) person, an organization, an agent (such as a robot or other such artificial intelligence (AI) or pseudo-AI program), a computing device, computer program code, etc., or a collection of such entities. For convenience and brevity, in the specific examples described in more detail below, the entity 120 is typically a human user, it being understood that the entity may be of a different type.

The relying party 130 may be something remote from the user, such as a bank with which the user 120 holds a bank account, a corporate network at the user's employer, an online retailer or service provider, or the like. The relying party 130 may be something local to the user, such as a shop assistant at a shop at which the user 120 is physically present or some local telecommunications or computing device in the physical possession of the user 120.

The user 120 has one or more unique identifying characteristics. The unique identifying characteristics may include physical attributes of the user 120, or a secret known only to the user 120 such as a PIN (personal identification number). Examples of physical unique identifying characteristics include a fingerprint, other biometric information such as DNA, a heartbeat or biorhythms. Such unique identifying characteristics can be used by the authentication device 110 to provide a linkage between the user 120 and the authentication device 110. This linkage can be used to provide a known level of binding and immutability between the user 120 and the authentication device 110.

The attributes of the user 120 may include other, non-physical attributes. Examples of other, non-physical attributes of the user 120 include the occupation, home address, work telephone number, mother's maiden name, etc. of the user 120. The user 120 has one or more facets (or "personas") of their overall identity. The user 120 uses a persona to represent a different aspect of itself through a collection of attributes associated with that persona. The user 120 represents itself using a persona in interactive situations. A persona may have a related persona identifier.

In the specific examples described in more detail below, the user 120 has one or more digital personas. A digital persona of the user holds or includes data corresponding to one or more attributes of the user 120. In these specific examples, one or more of the digital personas of the user 120 are stored as digital persona data 160 in the data store 150 of the intermediary 140. In these specific examples, the data store 150 is referred to for convenience as a "persona store" 150. It will nevertheless be understood that the data store 150 may store other data additional to digital persona data. Furthermore, again for convenience, a digital persona 160 is often referred to herein simply as a "persona" 160.

Where the user 120 has multiple personas 160, the multiple personas may all be stored in a single persona store 150. Alternatively, some or all of the personas 160 may be stored in different persona stores 150.

In an example, the intermediary 140 is a "persona provider". A persona provider creates or "provides" personas. Examples of persona provider include a (natural) person, an organization, an agent (such as a robot or other such artificial intelligence (AI) or pseudo-AI program), a computing device, computer program code, etc., or a collection of such entities that provide personas. In a specific example, a persona provider creates a new persona of or for the user 120 and stores the persona in its persona store 150.

In another example, the intermediary 140 is different from the persona provider. For example, the intermediary 140 may be a communications device (for example a computing device) of the user 120. In this example, the intermediary 140 may receive the persona from the persona provider and store it in its persona store 150.

In another example, the persona is stored in both a persona store 150 at the persona provider and in a persona store 150 at an intermediary 140 that is different from the persona provider.

In another example, the authentication device 110 itself includes a persona store 150 that stores one or more personas 160 of the user 120.

The attributes of the user 120 that are held in a particular persona 160 of the user 120 may be those attributes deemed appropriate by the user 120 for being held in that particular persona. Alternatively or additionally, attributes of the user 120 that are held in a particular persona 160 of the user 120 may be those attributes that the persona provider requires be held in the particular persona.

In an example, a persona 160 is an authoritative source for the attributes held in that persona 160. The persona 160 can be used by the user 120 to convey higher levels of trust to the relying party 130.

An example of such trusted attributes would be those held in a government-authorized or government-issued "citizen" persona 160. A citizen persona may hold, for example, the date-of-birth, citizenship, right-to-work etc. attributes of the user 120. The citizen persona 160 may be created for the user 120 by for example a government-authorized citizen persona provider. The user 120 may require the citizen persona 160 to allow them to have access to government electronic services. In another example, the user 120 has multiple citizen personas 160 for multiple countries. The user 120 may create multiple citizen personas 160, for example where the user 120 has dual-citizenship or where the user 120 needs to register for tax in multiple countries.

In another example, the user 120, upon joining a new organization, may link their authentication device 110 to a "corporate" persona 160. The corporate persona 160 may be created by that organization. The corporate persona 160 may also be held by that company in a persona store 150. The user 120 uses the corporate persona 160 to represent the user in interactions in a professional capacity. Attributes of the user 120 associated with the corporate persona 160 may include, for example, their chosen name in the workplace, the occupation or title of the user 120 and the department the user 120 works for.

In another example, the user 120 may create a persona 160 with no personal attributes for use as an "anonymous" persona 160 for use with voting, or another anonymous persona 160 for use with blogging against an oppressive regime.

In an example, the user 120 may have a "personal" persona 160 by which the user 120 represents themself in interactions with friends. In one example, the user 120 may create a personal persona 160 populated with self-asserted attributes. Examples of such self-asserted attributes include their nickname or the fact they are allergic to shellfish or dislike mushrooms.

In the physical world, the user 120 knows and understands the relationship between the different personas 160 they use.

In the digital world, the authentication device 110 holds the links between the digital representation of the user 120 and the various digital personas 160 of the user 120. For example, the authentication device 110 may hold a persona identifier of each persona 160 of the user 120 that has been bound or linked to the authentication device 110. Only the authentication device 110 and the user 120 know the relationship between the multiple disparate personas 160 associated with the user 120. In an example, the persona identifier of a persona is produced cryptographically. For example, an identifier of the user 120 and an identifier of a persona provider may be processed using a strong cryptographic hash function. This provides a new and unique cryptographic identity for the persona. Creating the persona identifier in this way provides a one-way trust between the user 120 and the persona 160. A party having access to one persona 160 associated with the user 120 is, in general, unable to link, connect or deduce the other personas 160 associated with the user 120, or indeed the user 120. The user 120 is therefore able to compartmentalize the attributes associated with each persona 160 to preserve privacy.

By way of example only, the user 120 may have, for example, a personal persona 160 and a corporate persona 160. The personal persona 160 and the corporate persona 160 are different, but still both relate to the same user 120. Through binding of the user 120 to the device 110, the personal persona 160 and the corporate persona 160 of the user 120 are bound to the same physical entity.

The physical user 120 is immutably linked to the authentication device 110. In other words, the linkage between the user 120 and the authentication device 110 is not subject or susceptible to change or, at least, is not usually, typically or easily susceptible to change. The level to which the user 120 is immutably bound to the device 110 can be understood by the relying party 130 by the communication of the attributes of the authentication device 110. An example of this immutable linkage is biometric data representing the fingerprint of the user 120. The fingerprint of the user 120 is immutably linked to the device 110. In some examples, the linkage may be a secret identifier such as a PIN.

The user 120 may choose when to create an additional persona 160. The user 120 may also choose when to link their authentication device 110 to an existing persona 160.

The authentication device 110 may take various different forms. Examples of authentication devices 110 include a security token, identity bracelet, identity chip, watch, identity card, mobile telephone, computer, tablet computing device, software or computer program code. In any event, typically the authentication device 110 will be local to the user 120. The authentication device 110 will, in an embodiment, be in the physical possession of the user 120 and the user 120 can input commands and receive messages and the like directly with the authentication device 110.

In an example, the authentication device 110 is agnostic of the intermediary 140 and/or the relying party 130 with which it is used. In other words, the authentication device 110 is useable with different intermediaries 140 and/or different relying parties 130, regardless of the nature of the intermediary 140 and/or the relying party 130.

The authentication device 110 performs authentication locally to the user 120. In an example, local authentication involves prompting the user 120 to provide authentication credentials such as a fingerprint or a PIN, receiving the authentication credentials from the user 120, comparing the received authentication credentials with locally stored authentication data and determining an authentication result based, at least in part, on whether the received authentication credentials match the pre-stored authentication data. By performing the authentication locally, neither the received credentials nor the locally stored authentication data are ever exposed outside of the authentication device 110.

In an example, the authentication device 110 indicates to the intermediary 140 at least data identifying the type of the authentication device 110 and the authentication process or processes used to authenticate the user 120 to the authentication device 110. By inference, the authentication device 110 indicates to the intermediary 140 the level of immutable binding of the user 120 to the authentication device 110. This allows the intermediary 140 to assert relevant attributes from a particular persona 160 together with relevant assertions from the authentication device 110 to be passed to the relying party 130. The indication may be made by the authentication device 110 cryptographically asserting the information.

The identity of the user 120 that is indicated identifies the identity or, typically persona, of the user 120 to which the authentication relates.

The intermediary 140 may take various different forms. Examples of the intermediary 140 include a (natural) person, an organization, an agent (such as a robot or other such artificial intelligence (AI) or pseudo-AI program), a computing device, computer program code, etc., or a collection of such entities.

In an example, the intermediary 140 is remote from the user 120 and the authentication device 110 of the user 120. As one specific example, the intermediary 140 may be a government-authorized provider of citizen personas located at government premises. The government-authorized provider includes a persona store 150 that stores a citizen persona 160 of the user 120. The authentication device 110 of the user communicates with the remote intermediary 140 via a communications network, such as the Internet and/or a cellular wireless network for example.

In an example, the intermediary 140 is local to the user 120 and the authentication device 110 of the user 120. For example, the intermediary 140 may be a smart mobile telephone of the user 120 that the user typically keeps in close proximity to them. The smart mobile telephone 140 includes a persona store 150 that stores one or more persona 160 of the user 120.

In an example, the authentication device 110 is not capable of communicating with the relying party 130 itself. The authentication device 110 may communicate with the relying party 130 via the intermediary 140. In this example, the relying party 130 receives the assertions from the intermediary 140. The relying party 130 determines whether or not to accept the assertions made by the user 120 that are made on behalf of the user by the intermediary 140 that stores the persona 160 of the user 120. The determination by the relying party 130 is based at least in part on at least one authentication process used by the authentication device 110 to link itself to, or authenticate, the user 120.

This allows the relying party 130 to make a risk-based decision on whether or not to accept the result of an assertion from the user 120 via one or more of the personas 160 of the user 120. In a specific example to illustrate this, the relying party 130 may be a bank with which the user 120 holds a bank account. The bank considers authentication based on an active persona of the user 120 to allow the user 120 to access their online banking service and inspect bank balances, say. In an example, an "active" persona is a persona in relation to which authentication has been recently performed and for which the authentication is still valid. In a specific example, the authentication device 110 is in the form of an authentication bracelet worn by the user 120. The user 120 may authenticate one of their personas using the bracelet. The authentication of the user 120 may be valid (or at least be deemed to still be valid) while the user 120 is still wearing the bracelet. The bank can determine that it is likely that the bracelet is still being worn by the authenticated user and may thus deem the previous authentication sufficient for low-risk transactions. This may improve usability since the user 120 need not actively perform authentication in such examples. However, the bank may require additional authentication, for example based on the intermediary 140 being able to assert, or pass on an assertion, that an authentication process has taken place between user 120 and authentication device 110 within, say, the last 30 seconds. The bank may additionally or alternatively require that the authentication device 110 can assert that it has used an authentication process acceptable for the risk associated with the transaction amount. For example, the bank may require an assertion that authentication based on biometric information of the user 120 has been used, where transaction amounts exceed a certain value. As one practical example to illustrate this example, in the case of a user 120 with a fingerprint-enabled authentication device 110 say, authentication based on biometric information would be achieved by an on-screen or verbal instruction for the user 120 to place their finger in the fingerprint reader of their authentication device 110.

In some examples, the relying party 130 and the intermediary 140 are remote from the authentication device 110. In a specific example, the relying party 130 is an online merchant or some other remote party. The authentication device 110 communicates with both the intermediary 140 that stores the linked personas 160 of the user 120 and the online merchant or other remote party via a communications network, such as the Internet and/or a cellular wireless network for example.

In other examples, the relying party 130 and the intermediary 140 are local to the authentication device 110. For example, the relying party 130 may be an assistant in a shop or bank or the like in which the user 120 is physically present.

The authentication device 110 may, but need not, indicate the actual result of the authentication to the relying party 130. In other words, the authentication device 110 may indicate whether the user 120 was successfully authenticated or whether the user was not successfully authenticated. For example, the authentication device 110 may be configured to indicate the authentication result only if authentication of the identity of the user 120 is successful. The authentication device 110 may be configured not to transmit the result data if the authentication is unsuccessful.

In an example, the one or more authentication processes are selected by the user 120. This allows the user 120 to have some control over the authentication process. However, this may mean that the relying party 130 will not accept the authentication result asserted by the authentication device 110. For example, if the relying party 130 requires an assertion from the authentication device 110 that the authentication is based on a biometric linkage, the relying party 130 would not accept the authentication assertion from the intermediary 140 if the authentication device 110 only asserts that authentication is based on a PIN.

In another example, one or more authentication processes are selected by the relying party 130. This allows the relying party 130 to have some control over the authentication process by selecting authentication processes for the authentication device 110 to use to authenticate the identity of the user 120. This increases the likelihood of the authentication performed by the authentication device 110 being accepted by the relying party 130.

In another example, both the user 120 and the relying party 130 select one or more authentication processes. The one or more authentication processes used to authenticate the identity of the user 120 may be those which are selected by both the user 120 and the relying party 130.

There are various ways in which the authentication device 110 may make assertions to the intermediary 140 storing its linked personas 160 for use by the relying party 130. The way in which the authentication device 110 asserts the authentication result depends on the capabilities and nature of the authentication device 110 and the relying party 130. In one example, the authentication device 110 may be able to transmit the authentication result to the relying party 130 using the intermediary 140 via a communications network, such as the Internet and/or a cellular wireless network for example. In another example, the intermediary 140 is able to display the authentication result for manual or automatic provision to the relying party 130. This may be convenient, for example, when the user 120 is physically present with the relying party 130. In this example, the intermediary 140 may be a smart phone of the user 120 say.

In addition to confirming that the identity of the user 120 has been authenticated and at least one authentication process used to authenticate the identity of the user 120, the intermediary 140 may be able to display or indicate one or more attributes of the authentication device 110. In an example, the authentication device 110 indicates an attribute of the authentication device 110 to allow the relying party 130 to make a more complete or thorough risk-based decision on authentication of the identity of the user 120. This is because the relying party 130 can have a fuller understanding of the environment within which the identity of the user 120 is being authenticated.

In a specific example, the authentication device 110 is operable to assert the manufacturer identity of the authentication device 110. In a specific example, the authentication device 110 is operable to assert a make and/or model of the authentication device 110. In a specific example, the authentication device 110 is operable to assert an issuer of the authentication device 110. In a specific example, the authentication device 110 is operable to assert that authentication is being carried out in real-time. In a specific example, the authentication device 110 is operable to assert that authentication has been carried out within a specified time period. The time period may be specified by the intermediary 140, via a request from the relying party 130 or otherwise. In a specific example, the authentication device 110 is operable to assert that the user 120 has been authenticated again following a re-authentication request. The re-authentication request may be from the relying party 130, the intermediary 140, or otherwise. In a specific example, the authentication device 110 is operable to confirm a response by the user 120, via the intermediary 140, to a request from the relying party 130. In a specific example, the authentication device 110 is operable to report that authentication is, or appears to be, taking place under duress.

In a specific example, the authentication device 110 is configured to processes and/or respond to requests relating to a persona 160 only if that request is digitally signed (i.e. includes some secure digital identifier of the source of the request).

As explained above, the relying party 130 uses the authentication result asserted by the authentication device 110 to decide whether or not to accept the authentication performed by the authentication device 110.

In an example, the authentication device 110 is indirectly connected to the relying party 130 via the intermediary 140 and one or more further intermediate elements. For example, one connection to the authentication device 110 may be in the form of a Universal Serial Bus (USB) interface; that is a device that has a USB connector. The USB-enabled authentication device 110 is connected via the USB connector to a computing device belonging to or otherwise accessible to the user 120. The USB authentication device 110 may establish a connection with the intermediary 140 and/or the relying party 130 via the computing device.

The authentication device 110 may have one or more interfaces to allow it to communicate with other computing devices. For example, these may include a standard credit card style "chip" (ISO/IEC 7810 and ISO/IEC 7816) contact interface and/or one or more contactless interfaces. Examples of contactless interfaces include radio frequency or induction interfaces.

Various different examples of scenarios in which the authentication device 110 authenticates an identity of the user 120 using one or more authentication processes will now be described by way of example only.

In one example scenario, the authentication device 110 is used to authenticate the identity of the user 120 in relation to a persona 160 held in a persona store 150 in a mobile telephone (or other personal electronic device) 140 of the user 120. Authenticating the identity of the user 120 to their mobile telephone (also the relying party 130 in this example) may be used, for example, to unlock the phone for use by the user 120.

In another example scenario, the authentication device 110 is used to authenticate the identity of the user 120 for multiple persona 160 held in a persona store 150 in the mobile telephone (or other personal electronic device) 140 of the user 120. Authenticating the identity of the user 120 for these multiple personas (say a "corporate" persona and a "personal" persona) allows the mobile telephone (also the relying party 130 in this example) to grant the user 120 access to both corporate and personal email on or accessed by the mobile telephone.

In another example scenario, the user 120 has a corporate persona 160. The authentication device 110 is used to authenticate the corporate persona 160 of the user 120. This may be to allow the user 120 access to confidential information stored on a corporate computer, mobile telephone, tablet device or the like.

In another example scenario, the user 120 has a personal persona 160. The authentication device 110 is used to authenticate the personal persona 160 of the user 120. In one specific example scenario, authenticating the personal persona 160 of the user 120 allows the user 120 to cryptographically sign personal email as indisputably originating from them. In another specific example scenario, authenticating the personal persona of the user 120 allows the user 120, using their personal persona 150, to unlock a front door to their house or allows their car or other vehicle to be started.

In another example scenario, the user 120 has a citizen persona 160. The authentication device 110 is used to authenticate the citizen persona 160 of the user 120. This may be to allow the user 120 to have access to government electronic services for example.

In another example scenario, the user 120 has an anonymous persona. The anonymous persona 160 is a derivative of a citizen identity of the user 120 and is devoid of any personally identifiable attributes. The authentication device 110 is used to authenticate the anonymous persona of the user 120. This may be for example to allow the user 120 to assert their right to vote, anonymously and only once.

Figure 2:
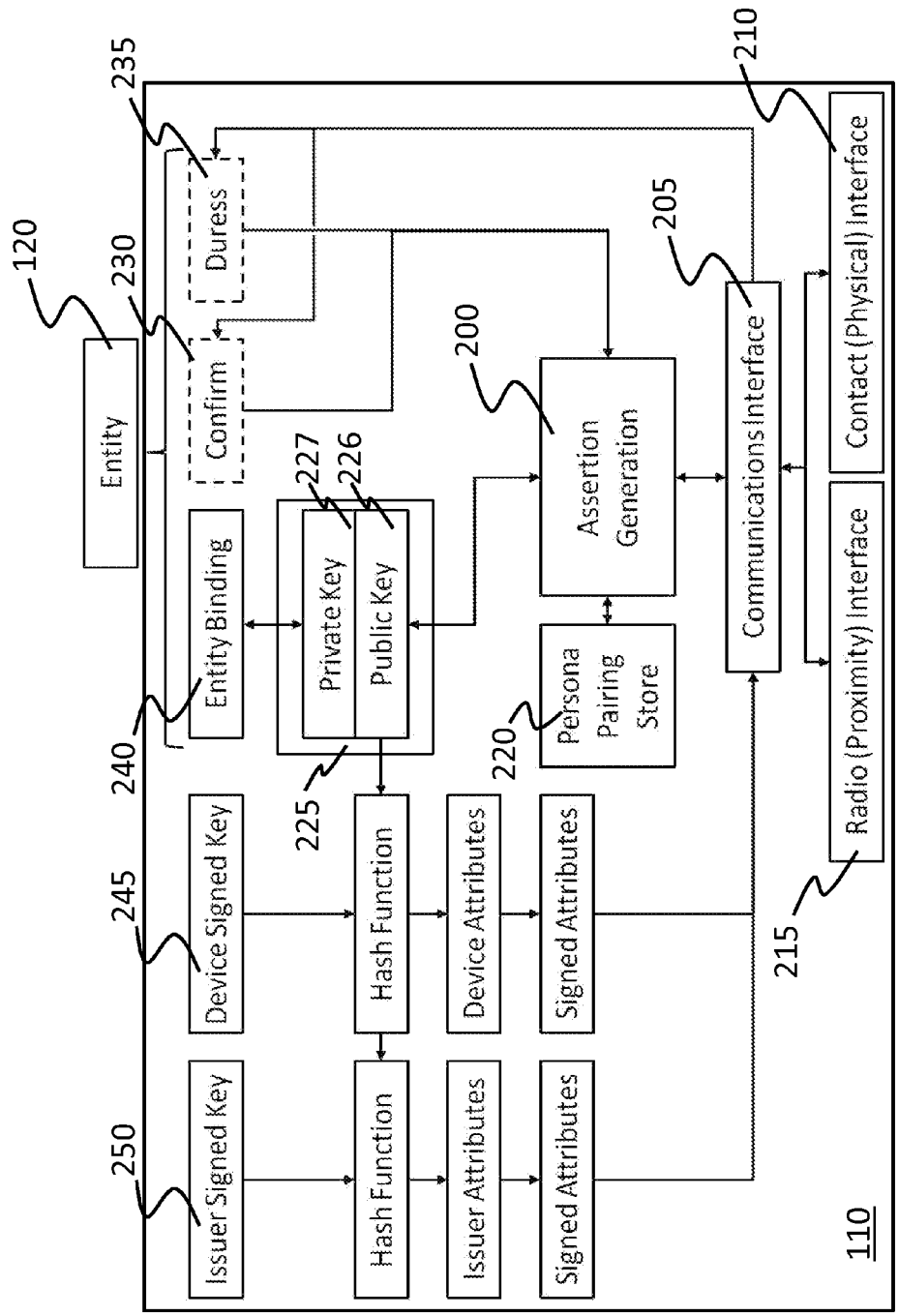
FIG. 2 shows a block diagram of an example of an authentication device in accordance with an embodiment of the present invention.

Referring now to FIG. 2, there is shown a schematic block diagram of an example of an authentication device 110. The authentication device 110 comprises an authentication result generator 200. The authentication result generator 200 generates an authentication result. The authentication result includes assertions about the linkage of the user 120 to the authentication device 110 and one or more authentication processes that were used by the authentication device 110 to authenticate the identity of the user 120. The authentication device 110 indicates the authentication result for use by the intermediary 140 holding the one or more personas 160 of the user 120 and/or for use by the relying party 130.

The authentication device 110 comprises a communications interface controller 205. The communications interface controller 205 controls one or more communications interfaces.

In this example, the authentication device 110 includes a physical communications interface 210. The physical communications interface 210 is controlled by the communications interface controller 205. The physical communications interface 210 allows the authentication device 110 to communicate with other devices using one or more physical connections. A specific example of a physical communications interface 210 is a USB interface. Another specific example of an authentication device 110 having a physical communications interface 210 is a credit card form factor authentication device 110 with contact pads. Another specific example of a physical communications interface 210 is a near field communication (NFC) interface.

In this example, the authentication device 110 includes a radio communications interface 215. The radio communications interface 215 is controlled by the communications interface controller 205. The radio communications interface 215 allows the authentication device 110 to communicate with other devices using one or more radio connections.

In this example, the authentication device 110 includes a persona pairing or identity binding store 220. The identity binding store 220 stores the cryptographic identity of one or more persona 160 with which the user 120 has chosen to pair the authentication device 110.

In this example, the authentication device 110 includes a cryptographic store 225. One or more cryptographic keys are stored in the cryptographic store 225. The cryptographic key or keys may be used for various purposes. For example, the cryptographic keys may be used to encrypt data. The cryptographic keys may be used alternatively or additionally to digitally sign data, such as assertions. In a specific example, one or more public cryptographic keys 226 and a private cryptographic key 227 are stored in the cryptographic store 225. The public key(s) 226 and private key 227 may be generated when a new identity of the user 120 is bound to the authentication device 110. A persona provider 150 may likewise generate a public/private key pair. The authentication device 110 and the persona provider may exchange the public keys for use in encrypted communications between the authentication device 110 and the relying party 130 in a manner known per se. This helps to avoid spoofing and replay attacks.

In this example, the authentication device 110 comprises a confirmation component 230. The confirmation component 230 is used to process confirmation requests and responses. For example, the confirmation component 230 may prompt the user 120 to confirm a Yes or No response to a particular confirmation request. The confirmation component 230 interprets user input received in response to the prompting to determine whether the user has indicated a Yes or No response to the confirmation request. The confirmation component 230 provides the Yes or No response to the authentication result generator 200. The authentication result generator 200 may then assert the Yes or No response, for example to the relying party 130, using an appropriate persona 160.

In this example, the authentication device 110 comprises a duress component 235. The duress component 235 is used to determine whether the user 120 is providing inputs to the authentication device 110 under duress. For example, the duress component 235 may receive predetermined user input that it interprets as indicating that the user 120 is authenticating under duress. The duress component 235 provides a duress indication to the authentication result generator 200. The authentication result generator 200 may then assert the duress indication, for example to the relying party 130, using an appropriate persona 160.

The authentication device 110 comprises a binding component 240 which is used to bind the identity or identities of the user 120 to the authentication device 110.

The authentication device 110 in this example includes manufacturer certificate functionality. A manufacturer certificate 245 is issued by the manufacturer of the authentication device 110. The manufacturer certificate 245 includes data identifying one or more attributes of the authentication device 110. For example, the one or more identified attributes may include the manufacturer of the authentication device 110, the model of the authentication device 110 and authentication capabilities of the authentication device 110. To assert the one or more attributes of the authentication device 110, the authentication device 110 processes the manufacturer certificate 245 using a hash function. Processing using the hash function may be for reasons of efficiency, data integrity or otherwise. The resulting hashed data is signed using the private key 227 of the user 120 to produce signed device attribute data. The signed device attribute data can be asserted to the relying party 130 using the appropriate persona 160 to assert the attributes of the authentication device 110. The relying party 130 can verify the digital signature of the signed device attribute data using the public key 226 of the manufacturer.

The authentication device 110 in this example includes issuer certificate functionality. An issuer certificate 250 is issued by an issuer of the authentication device 110. The issuer certificate 250 includes data identifying one or more attributes of the issuer. For example, the one or more identified attributes may include the identity the issuer. To assert the one or more attributes of the issuer, the authentication device 110 processes the issuer certificate 250 using a hash function. Processing using the hash function may be for reasons of efficiency, data integrity or otherwise. The resulting hashed data is signed using the private key 227 of the user 120 to produce signed issuer attribute data. The signed issuer attribute data can be provided to the relying party 130 to assert the attributes of the issuer of the authentication device 110. The relying party 130 can verify the digital signature of the signed issuer attribute data using the public key 226 of the issuer.

For example, the relying party 130 may use an "issuer" assertion to determine that the supply chain leading up to the issuance of the authentication device 110 has integrity and/or that the authentication device 110 was immutably bound to the user 120 using a robust process.

The authentication device 110 may be powered in various different ways. Examples of the ways in which the authentication device 110 may be powered include being powered when in proximity of an electromagnetic field, being powered by body heat of the user 120 and being powered by a battery.

In an example, the authentication device 110 is operable to attract the attention of the user 120 by generating one or more alerts. Examples of such alerts include a vibration alert, an audible alert and a visual alert. The authentication device 110 may be configured to generate an alert, for example, when the authentication device 110 receives a request to bind a new persona of the user 120 to the authentication device 110.

In an example, the authentication device 110 is operable to detect tampering with the authentication device 110. In a specific example, upon detecting tampering, the authentication device 110 destroys some or all data stored in it. For example, the authentication device 110 may destroy the private key 227 and/or identity binding data (stored persona data) upon detecting tampering.

In an example, the authentication device 110 is capable of determining the death and/or presumed death of the user 120. Death of the user 120 may be presumed if the user does not use the authentication device 110 for a predetermined period of time. In a specific example, upon determining the death or presumed death of the user 120, the authentication device 110 destroys some or all data stored in it. For example, the authentication device 110 may destroy the private key 227 and/or identity binding data upon determining the death or presumed death of the user 120.

In another specific example, the linkage between the authentication device 110 and user 120 is based on DNA or a linkage to the user's biological condition (such as biorhythms). If the authentication device 110 is unable to detect those characteristics of the user 120, it may conclude indicate death or removal from the user 120 and thus trigger self-destruction.

In an example, the authentication device 110 is configured to protect itself against so-called 'black box' attacks. Black box attacks are designed to determine the internal functionality of the authentication device 110 through external probing. In a specific example, the authentication device 110 is configured to detect flooding (or 'fuzzing') attacks, where the authentication device 110 is flooded with a large number of requests.

In an example, the authentication device 110 is configured to timeout using a watchdog timer or similar mechanism. The timeout may be used to bring the authentication device 110 back from an unresponsive state to a state of normal operation.

In a specific example, the authentication device 110 does not contain any form of hardware identifier (such as a serial number or the like) that could be used to uniquely identify the user 120 with the particular authentication device 110.

Figure 3:
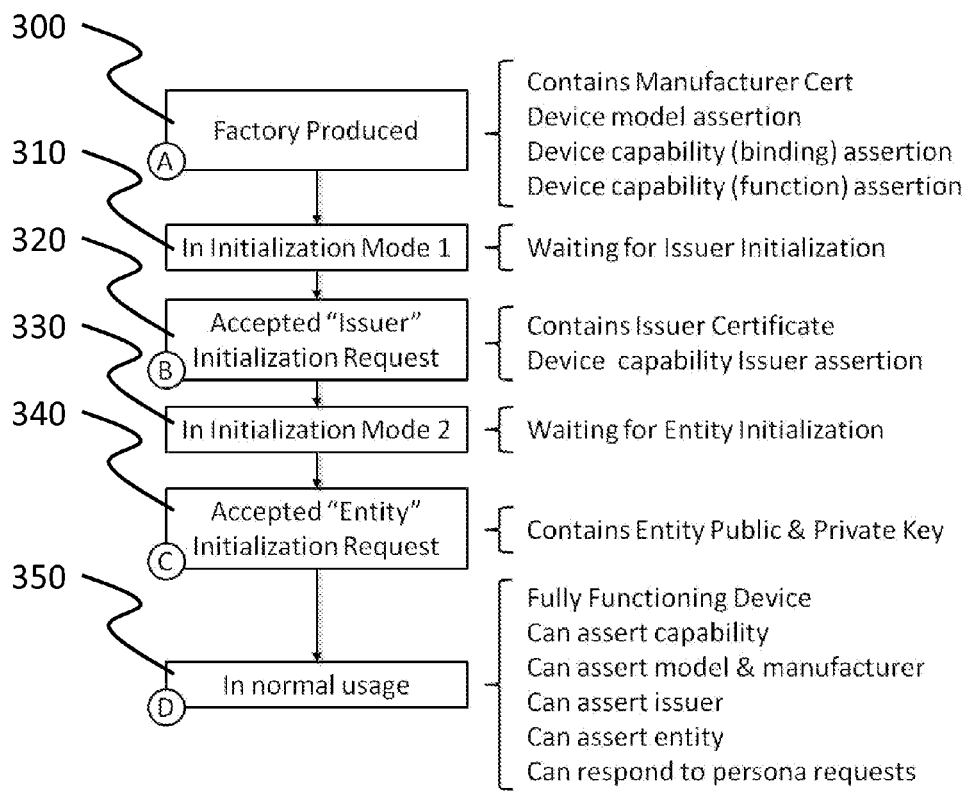
FIG. 3 shows a flow chart illustrating an example of a method of initializing an authentication device in accordance with an embodiment of the present invention.

Referring to FIG. 3, there is shown an overview of an example of a method of initializing the authentication device 110.

At 300, the authentication device 110 is in a factory-produced state. In this example, the authentication device 110 includes the manufacturer certificate 245 when in the factory-produced state.

At 310, the authentication device 110 is in a first initialization mode. In the first initialization mode, the authentication device 110 is ready for initialization by an issuer. The first initialization mode is therefore referred to hereinafter as the issuer initialization mode.

At 320, the issuer has initialized the authentication device 110. The authentication device 110 now includes the issuer certificate 250. The authentication device 110 may indicate its issuer, using the issuer certificate 250.

At 330, following issuance by the issuer, the authentication device 110 is locked into a second initialization mode. In the second initialization mode, the authentication device 110 is ready for binding to the user 120. The second initialization mode is therefore referred to herein as the user binding mode.

At 340, user binding has been successfully completed. User binding involves binding the user 120 with the authentication device 110 such that the authentication device 110 is personal to the user 120.

At 340 the authentication device 110 generates a random private key, known only to the authentication device 110, and from that a public key. It then stores the public and private keys 226, 227 associated with the user 120 in the cryptographic key store 225.

At 350, following user binding, the authentication device 110 enters and is locked into a normal usage mode. In the normal usage mode, the authentication device 110 is fully functional. For example, the authentication device 110 may be used to perform authentication of an identity of the user 120.

Figure 4:
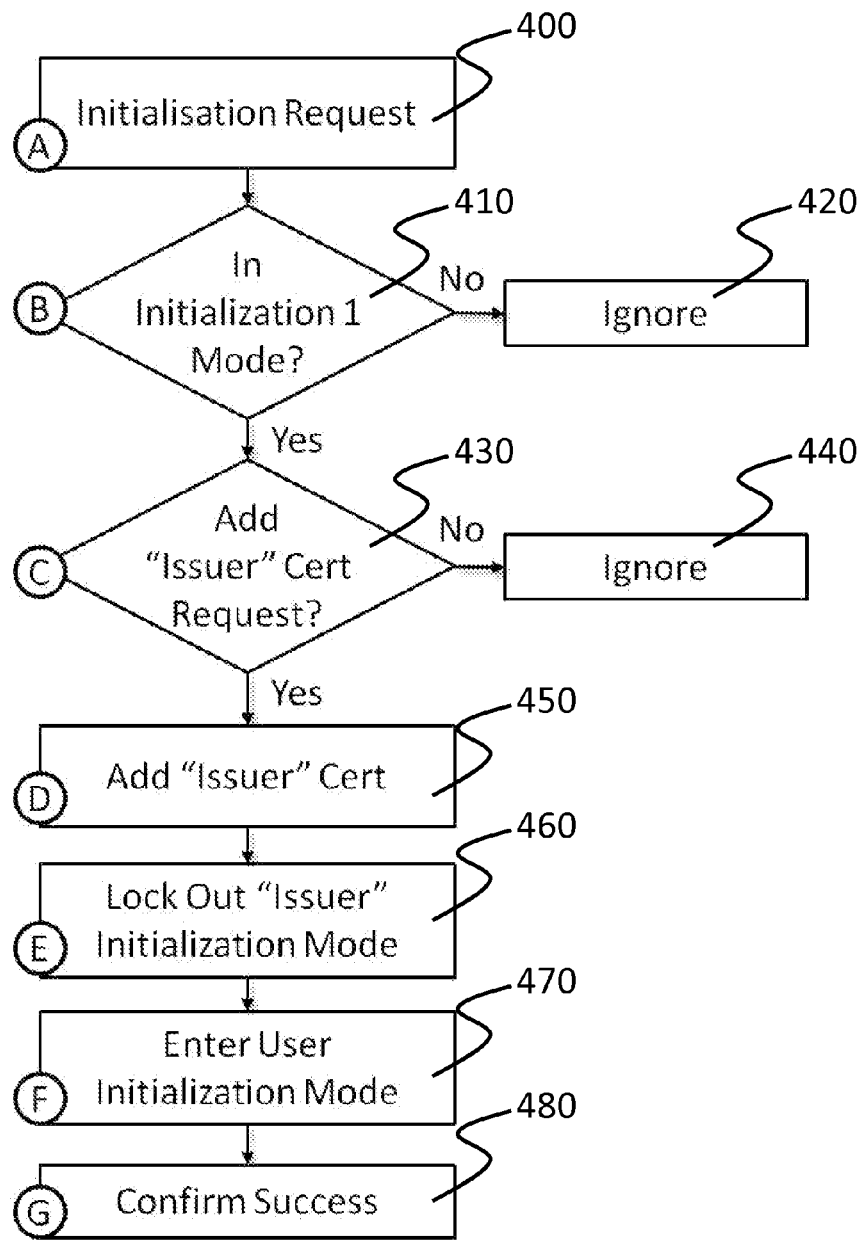
FIG. 4 shows a flow chart illustrating a sub-process of the method of FIG. 3, the sub-process being for initializing an authentication device in accordance with an embodiment of the present invention.

Referring to FIG. 4, there is shown an example of a method for initialization of the authentication device 110 by the issuer. In the example shown in FIG. 4, the issuer is a trusted issuer. A trusted issuer is an issuer that is trusted to perform issuer initialization to a guaranteed standard.

At 400, the authentication device 110 receives an issuer initialization request. There are various ways in which the authentication device 110 may receive the issuer initialization request, depending upon its capabilities and the nature of the issuer.

At 410, the authentication device 110 determines whether or not it is currently operating in the issuer initialization mode.

If the result of the determination of 410 is that the authentication device 110 is not currently operating in the issuer initialization mode, the authentication device 110 ignores, at 420, the issuer initialization request of 400.

If the result of the determination of step 410 is that the authentication device 110 is currently operating in the issuer initialization mode, the authentication device 110 determines at 430 whether the request of 400 includes a request to add the issuer certificate 250 to the authentication device 110.

If the result of the determination of 430 is that the request of 400 does not include a request to add an issuer certificate 250 to the authentication device 110, the authentication device 110 ignores at 440 the issuer initialization request of 400.

If the result of the determination of 430 is that the request of 400 includes a request to add the issuer certificate 250 to the authentication device 110, the authentication device 110 adds the issuer certificate 250 to the authentication device 110 at 450.

There are various different ways in which the authentication device 110 may obtain the issuer certificate 250. In one example, the issuer certificate 250 is included in the issuer initialization request. In another example, the authentication device 110 requests the issuer certificate 250 from the issuer following a determination at 430 that the request of 400 includes a request to add the issuer certificate 250 to the authentication device 110.

At 460, the authentication device 110 locks out the issuer initialization mode. In other words, the authentication device 110 does not allow further issuer initialization of the authentication device 110.

At 470, the authentication device 110 enters the user binding mode.

At 480, the authentication device 110 confirms successful completion of the issuer initialization process. For example, the authentication device 110 may confirm successful complication of the issuer initialization process to the user 120 and/or issuer via an appropriate notification.

Figure 5:
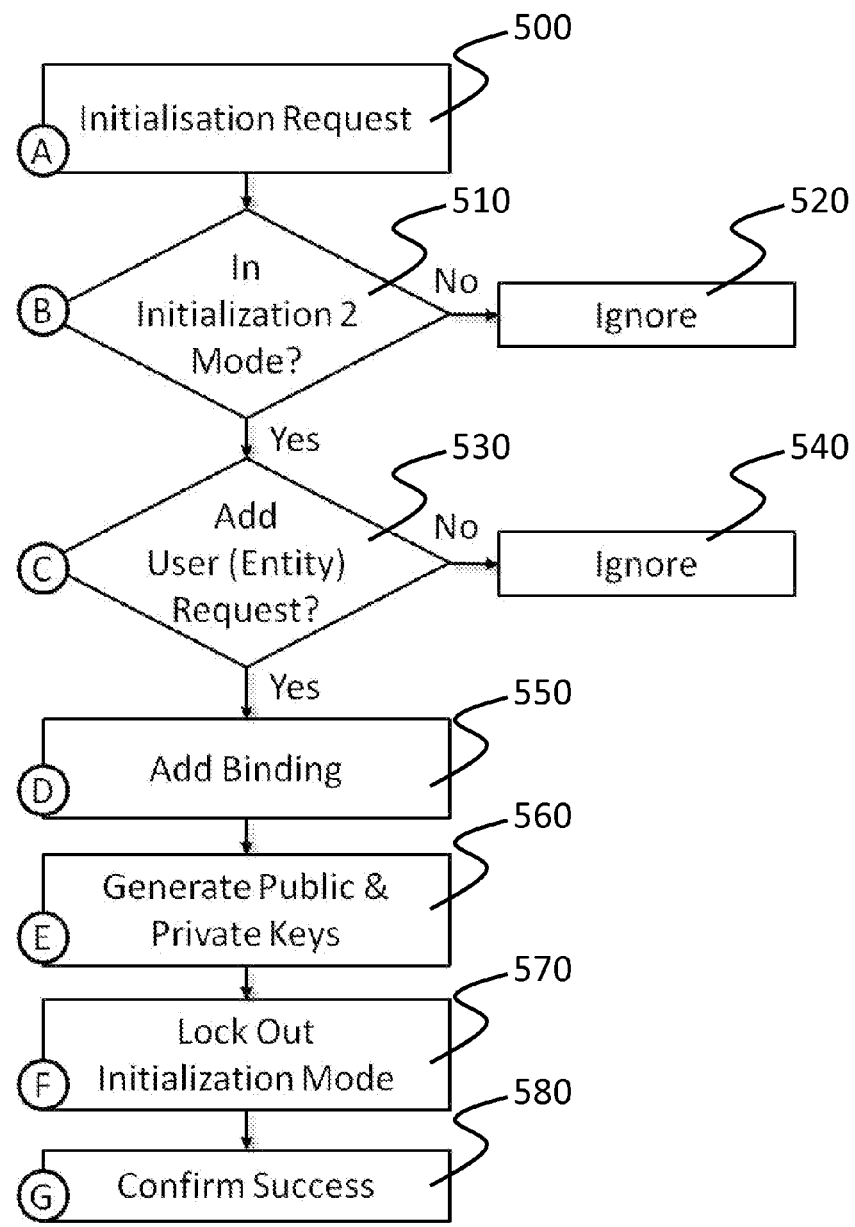
FIG. 5 shows a flow chart illustrating a sub-process of the method of FIG. 3, the sub-process being for initializing an authentication device in accordance with an embodiment of the present invention.

Referring to FIG. 5, there is shown an example of a method for binding the core identity of the user 120 to the authentication device 110. Note that this method is used for the initial binding (or immutable linking) of the user 120 to the authentication device 110 such that the authentication device 120 is personal to the user. Additional persona (containing facets or attributes of the user 120) may be bound to the authentication device 110, for example in the manner described with reference to FIG. 6 below.

At 500, the authentication device 110 receives a user-binding request.

At 510, the authentication device 110 determines whether or not it is currently operating in the user-binding mode.

If the result of the determination of 510 is that the authentication device 110 is not currently operating in the user-binding mode, the authentication device 110 ignores at 520 the user-binding request.

If the result of the determination of 510 is that the authentication device 110 is currently operating in the user-binding mode, the authentication device 110 determines at 530 whether the user-binding request includes a request to bind the user 120 to the authentication device 110.

If the result of the determination of 530 is that the user-binding request does not include a request to bind the user 120 to the authentication device 110, the authentication device 110 ignores the user-binding request at 540.

If the result of the determination of 530 is that the user-binding request includes a request to bind the user 120 to the authentication device 110, the authentication device 110 binds the user 120 to the authentication device 110 at 550.

At 560 the authentication device 110 generates a random private key, known only to the authentication device; and from that a public key. The authentication device 110 stores the public and private keys 226, 227 in the cryptographic key store 225. In a specific example, the public and private keys 226, 227 are generated solely for use with the identity of the user 120. In an example of the binding process, the user 120 is prompted to provide personal information to the authentication device 110. For example, the user 120 may be prompted to enter a PIN (personal identification number) and provide three normal, non-duress fingerprints and two duress fingerprints. In an example, all personal information is stored locally in the authentication device 110. The personal information is not exposed outside of the authentication device 110, including in particular not to the issuer, the intermediary 140, a persona provider, or the relying party 130. This provides privacy safeguards for the personal information as the user 120 does not have to provide personal identity information, specifically biometric information, or secret codes such as their PIN, to a third party (such as the relying party 130), or any intermediary device over which the user 120 may not have any control.

There are various ways in which the user 120 can be prompted to provide the personal information. For example, if the authentication device 110 includes a display, the authentication device 110 may display a message prompting the user to provide the personal information, or perform a biometric binding.

At 570, the authentication device 110 locks out the user-binding mode.

At 580, the authentication device 110 confirms successful completion of the user-binding process. For example, the authentication device 110 may confirm successful complication of the user-binding process to the user 120 via an appropriate notification. Once the user-binding process is complete, the authentication device 110 is personal to the user 120.

Following completion of the user-binding process, the authentication device 110 is under the sole control of the user 120. The authentication device 110 enters, and is locked in to normal operation mode. When operating in the normal operation mode, the authentication device 110 can be used, amongst other things, to authenticate only an identity of the user 120.

Figure 6:
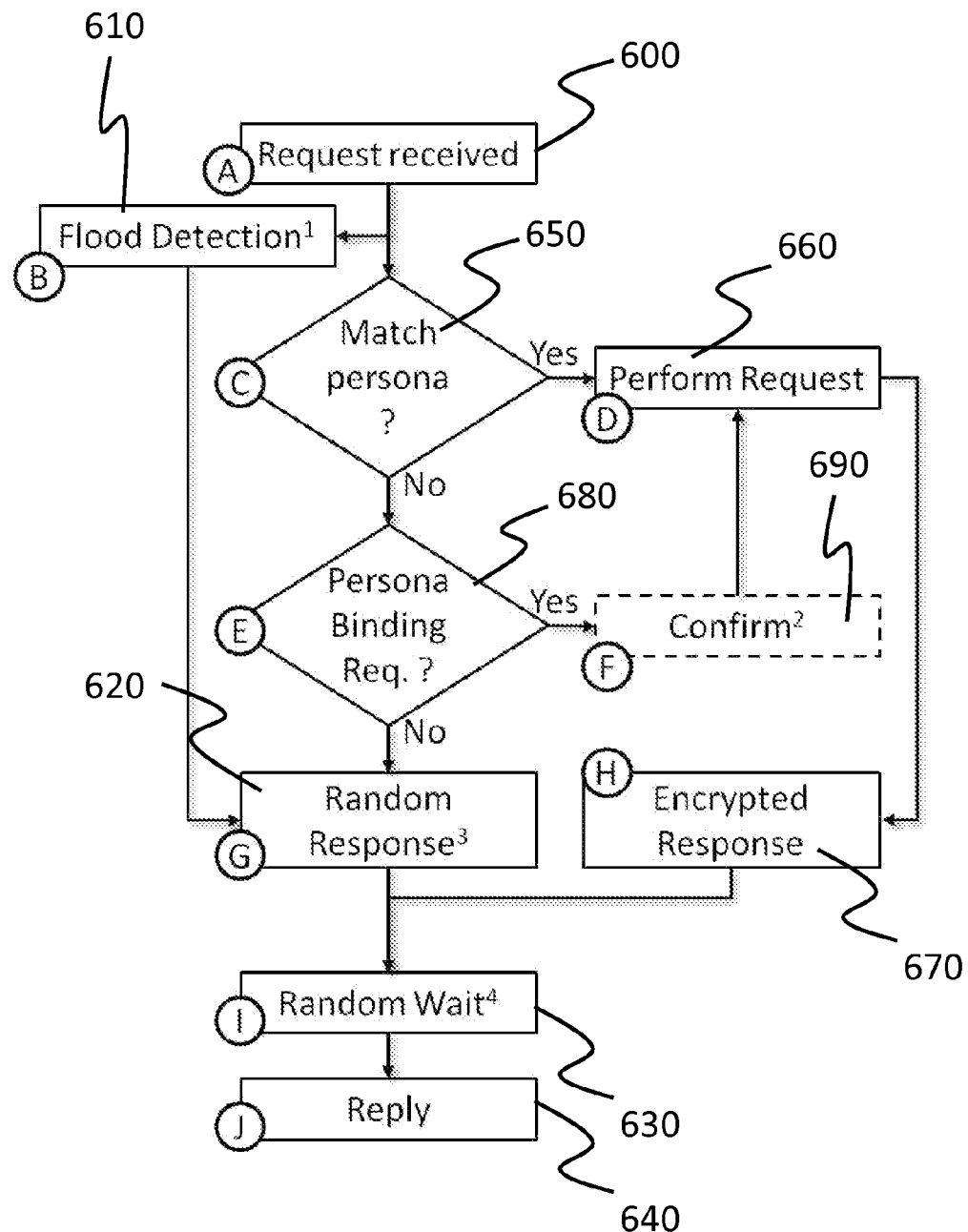
FIG. 6 shows a flow chart illustrating an example of operations performed by an authentication device in accordance with an embodiment of the present invention.

Referring to FIG. 6, there is shown an example of operations performed by the authentication device 110 in processing a request.

In this example, the authentication device 110 is currently operating in the normal operation mode. In this example, the authentication device 110 has been initialized by the issuer, for example in the manner described above with reference to FIG. 4. Additionally, in this example, the identity of the user 120 has been bound to the authentication device 110, for example in the manner described above with reference to FIG. 5.

At 600, the authentication device 110 receives a request. The request is received from a requestor.

In this example, the authentication device 110 is configured to perform several tests in response to receiving the request. The tests serve as countermeasures against a possible attack on the authentication device 110.

At 610, the authentication device 110 performs a flood detection test. The flood detection test is used to assess whether the received request is part of a flooding attack on the authentication device 110. In a flooding attack, an attacker sends a large number of requests to the authentication device 110. Each request identifies a different possible persona of the user 120. The attacker may determine that a particular persona of the user 120 has been bound to the authentication device 110 if the authentication device 110 responds to a request identifying that particular persona.

If the result of the flood detection test is that the authentication device 110 is being subject to a flooding attack, the authentication device 110 will respond to some requests randomly at 620. An example would be an attacker probing an authentication device with say 100,000 persona requests to determine which of the 100,000 are linked to the authentication device 110. By detecting a flood attack at 610 and responding at random at 620 (to say 1 in 10 of the requests) the attacker has no way of determining which responses are genuine.

At 630, the authentication device 110 waits a random amount of time before sending the response. The random wait is applied to stop an attacker deducing the internal functionality of the authentication device 110 from the response time. For example, by using a correlation of device make and type against response time, an attacker may deduce the internal functionality of the authentication device 110 by deducing the model of the authentication device 110.

At 640, the authentication device 110 sends any response to the requestor.

If no flooding attack is detected, the authentication device 110 determines at 650 whether the request of 600 relates to a persona of the user 120 that is bound to the authentication device 110. If the result of the determination of 630 is that the request of 600 relates to a persona of the user 120 that has been bound to the authentication device 110, the authentication device 110 performs the request at 660. For example, if the request of 600 comprises a request to confirm the authentication of the identity of the user 120, the authentication device 110 proceeds to authenticate the identity of the user 120.

At 670, the authentication device 110 generates an assertion in response to the request of 600. In an example, the authentication device 110 encrypts the response. In an example, the authentication device 110 digitally signs the response.

Following completion of 670, operations proceed per 630 and 640 described above. In particular, the authentication device 110 applies a random wait before sending the response to the request of 600.

If the result of the determination of 650 is that the request of 600 does not relate to a persona of the user 120 that is bound to the authentication device 110, the authentication device 110 determines at 680 whether the request of 600 includes a request to bind a new persona of the user 120 to the authentication device 110.

In an example, if the result of 680 is that the request includes a request to bind a new persona of the user 120 to the authentication device 110, the authentication device 110 requests the user 120 at 690 to confirm whether they authorize the request to bind the new persona of the user 120 to the authentication device 110.

If the user confirms the confirmation request of 690, processing continues per 660, 670, 630 and 640 described above. In particular, the authentication device 110 binds the new persona of the user 120 to the authentication device 110, generates a response to the new persona binding request, applies a random wait and then sends the response.

Step 680 is optional in that the authentication device 110 could be configured to perform the persona binding request without first requesting confirmation from the user 120. This may be the case if, for example, the authentication device 110 does not include confirmation capabilities.

Binding to a persona may be thought of as linking a particular facet of the user's overall identity to the authentication device 110. Authentication may be thought of as the process of determining whether the entity with which the authentication device 110 is interacting is the same entity that the authentication device 110 was bound to when the device 110 was initialized and the same entity that was using the authentication device 110 when it was used to link to (or create) that entity's personas 160. In summary, authentication proves "sameness".

In one example, the user 120 interacts with an organization to bind the new persona to the authentication device 110. For example, the user 120 may wish to create a new persona 160 specifically for use with the relying party 130. The user 120 may interact with the relying party 130 to create the new persona 160. The user 120 may interact with the relying party 130 in-person or remotely depending on the nature of the relying party 130.

In a specific example, where the relying party 130 is for example a bank or the like, the user 120 may go in person to the bank to create a new 'banking' persona 160 of the user 120. This may involve using, for example, appropriate paper documents or using their authentication device 110 to prove (via their citizen persona) that they are who they claim to be.

The user 120 may then request binding of the newly created banking persona 160 to the authentication device 110. Binding in this way allows the authentication device 110 and the relying party 130 to establish a trusted relationship at the persona binding stage in the form of a specific banking persona 160 for the user 120. This may involve the authentication device 110 and the relying party 130 generating, exchanging and storing cryptographic keys for the new persona.

The relying party 130 stores the newly created persona of the user 120. The relying party 130 may identify this persona of the user 120 subsequently in requests relating to the identity of the user 120. For example, the relying party 130 includes data identifying the persona of the user 120 in a request to the authentication device 110 to authenticate user 120. The relying party 130 may also identify the persona of the user 120 in data received from the authentication device 110. For example, the authentication device 110 may include data confirming that the entity that has performed the authentication is the entity behind the persona in relation to which authentication was requested.

Various examples of authentication devices in accordance with embodiments of the present invention will now be described, by way of example only. In each of the specific examples described below, the authentication device is powered wirelessly when in the proximity of an electromagnetic field. Furthermore, in each of the specific examples described below, the authentication device includes a radio communications interface via which it conducts wireless communications. Still furthermore, in each of the specific examples described below, the authentication device is configured to self-destroy on detecting tampering. In each of the specific examples described below, the authentication device is operable to assert its operability to self-destroy on detecting tampering.

Figure 7:
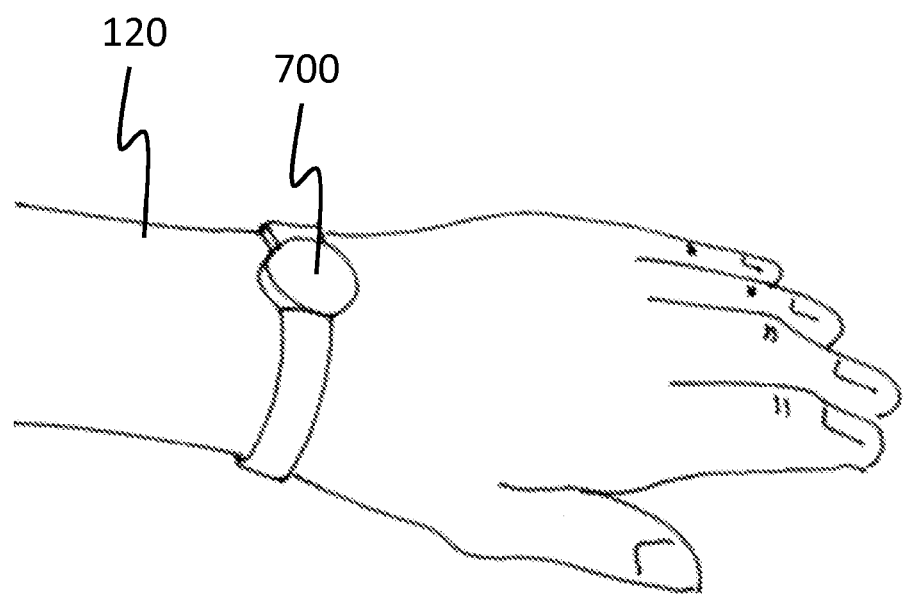
FIG. 7 shows a schematic representation of an example of an authentication device in accordance with an embodiment of the present invention.

Referring to FIG. 7, there is shown schematically an example of an authentication device. In this example, the authentication device is in the form of an identity bracelet 700. The identity bracelet 700 may conveniently be worn on the wrist of the user 120, round the neck, etc. In this example, the identity bracelet 700 is operable to determine whether the user 120 is physically present. The identity bracelet 700 is operable to assert its ability to determine whether the user 120 is physically present.

Figure 8:
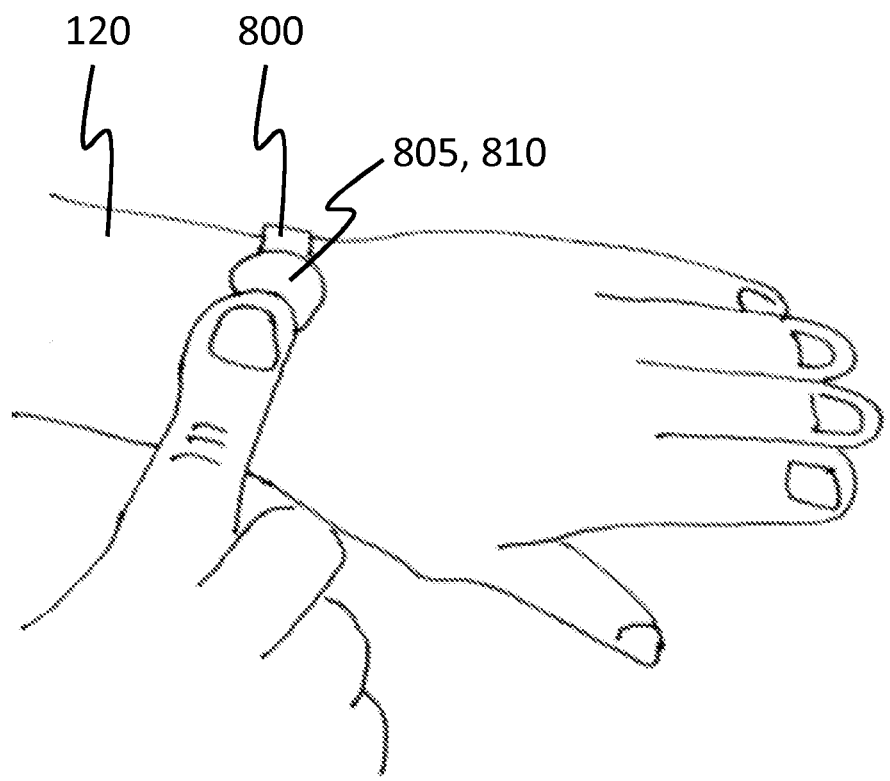
FIG. 8 shows a schematic representation of another example of an authentication device in accordance with an embodiment of the present invention.

Referring to FIG. 8, there is shown schematically another example of an authentication device. In this example, the authentication device is in the form of an identity bracelet 800. In this example, the identity bracelet 800 includes a touch-sensitive user interface 805. The identity bracelet 800 includes the confirmation component 230, which receives user input via the touch-sensitive user interface 805 and interprets the user input as indicating a Yes or No response to a confirmation request. The identity bracelet 800 is operable to indicate the Yes or No response to the confirmation request to the authentication result generator 200. The identity bracelet 800 is operable to assert its ability to indicate a Yes or No response.

In this example, the identity bracelet 800 includes a biometric reader 810, which forms part of the touch-sensitive user interface 805. The identity bracelet 800 is operable to read biometric information of the user 120 via the biometric reader 810. The identity bracelet 800 is operable to assert its ability to read biometric information of the user 120.

Figure 9:
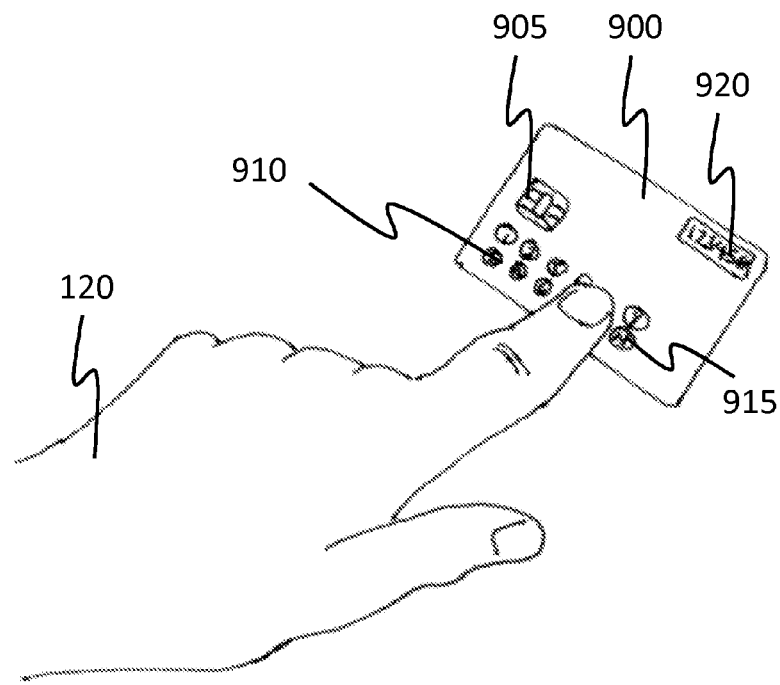
FIG. 9 shows a schematic representation of another example of an authentication device in accordance with an embodiment of the present invention.

In an example, the identity bracelet has a wrist strap. The wrist strap includes a sensor (not shown). A determination may be made based on an output of the sensor whether a previous authentication of the user 120 is still valid, or whether the previous authentication should no longer be considered valid. In one specific example, the output of the sensor indicates whether the identity bracelet 800 has been removed from the wrist of the user 120. In another specific example, the output of the sensor indicates whether the wrist band of the identity bracelet 800 has been cut or otherwise tampered with. In another specific example, the output of the sensor indicates detection of stress in the wrist band, which may indicate that the identity bracelet 800 has been removed over the hand of the user 120. In another specific example, the output of the sensor indicates a proximity of the identity bracelet 800 to the user 120. In each example, a determination of whether or not the identity bracelet 800 has been removed from the wrist of the user 120 can be made based on the output of the sensor. In each of these specific examples, the validity of a previous authentication of the user 120 may be dependent on the indication from the sensor. Combinations of two or more of these sensor arrangements may be used. Referring to FIG. 9, there is shown schematically another example of an authentication device. In this example, the authentication device is in the form of an identity card 900. In this example, the identity card 900 also includes a standard contact interface 905. In a specific example, the identity card 900 is operable to communicate via the contact interface 905. In a specific example, the identity card 900 is also powered via the contact interface when the identity card 900 is inserted into a powered identity card reader.

In this example, the identity card 900 includes a numeric keypad 910. The user 120 may, for example, enter a PIN via the inbuilt numeric keypad 910. In a specific example, the identity card 900 may use the entered PIN to authenticate an identity associated with the user 120. The identity card 900 is operable to assert its ability to receive the PIN.

In this example, the identity card 900 includes a Yes/No response keypad 915. The identity card 900 includes the confirmation component 230 which receives user input via the Yes/No response keypad 915 and interprets the user input as indicating a Yes or No response to a confirmation request. The identity card 900 is operable to assert its ability to indicate a Yes or No response to a confirmation request.

In this example, the identity card 900 includes a display 920. The display 920 is used to display information, for example to the user 120.

In this example, the identity card 900 includes the duress component 235. Duress may be detected, for example, where the user 120 enters a special duress PIN, which the duress component 235 interprets as indicating that the identity of the user 120 is being authenticated under duress. The identity card 900 is operable to assert its ability to indicate whether the identity of the user 120 is being authenticated under duress.

In this example, the identity card 900 includes the ability to timeout using the watchdog or similar mechanism. The identity card 900 is operable to assert its ability to timeout using the watchdog or similar mechanism.

In this same example, the identity card 900 includes a real-time clock (not shown), which is powered by a stored charge. In this example, the identity card 900 can use the real-time clock to guard against communication replay attacks, using accepted industry good practice. The identity card 900 is operable to assert its ability to guard against communication replay attacks.

Figure 10:
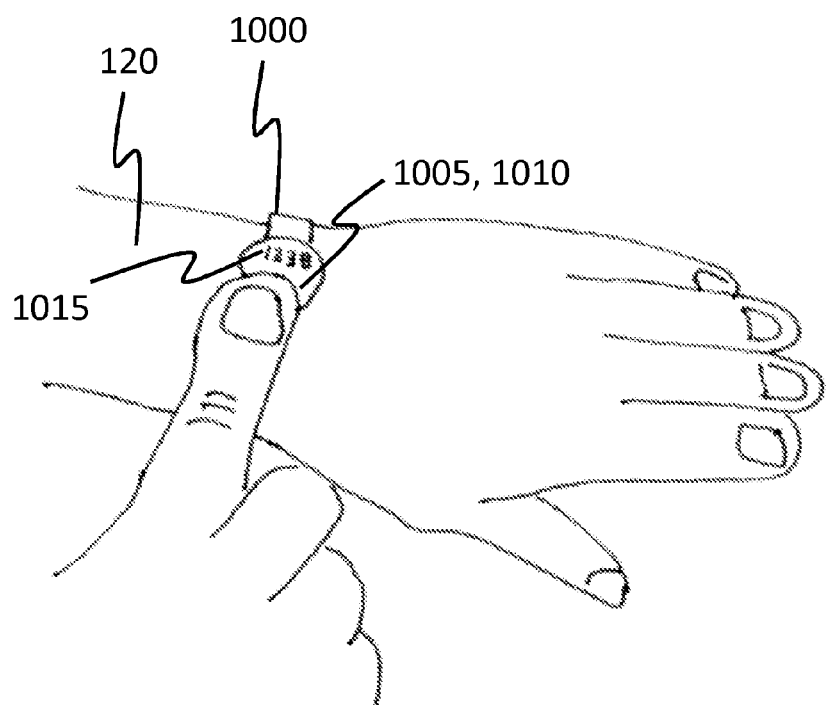
FIG. 10 shows a schematic representation of another example of an authentication device in accordance with an embodiment of the present invention.

Referring to FIG. 10, there is shown schematically another example of an authentication device. In this example, the authentication device is in the form of an identity bracelet 1000. In this example, the identity bracelet 1000 includes a touch-sensitive user interface 1005. The identity bracelet 1000 includes the confirmation component 230, which receives user input via the touch-sensitive user interface 1005 and interprets the user input as indicating a Yes or No response to a confirmation request. The identity bracelet 1000 is operable to indicate the Yes or No response to the confirmation request to the authentication result generator 200. The identity bracelet 1000 is operable to assert its ability to indicate a Yes or No response.

In this example, the identity bracelet 1000 includes a biometric reader 1010, which forms part of the touch-sensitive user interface 1005. The identity bracelet 1000 is operable to read biometric information of the user 120 via the biometric reader 1010. The identity bracelet 1000 is operable to assert its ability to read biometric information of the user 120.

In this example, the identity bracelet 1000 includes the duress component 235. Duress may be detected, for example, where the user 120 can indicate that they are authenticating under duress by providing a fingerprint from a particular one of their fingers. The identity bracelet 1000 is operable to assert its ability to indicate whether the identity of the user 120 is being authenticated under duress.

In this example, the identity bracelet 1000 includes a display 1015. The display 1015 is used to display information, for example to the user 120.

In this example, the identity bracelet 1000 includes a real-time clock (not shown), which is powered by a stored charge. In this example, the identity bracelet 1000 includes the ability to timeout using the watchdog or similar mechanism. The identity bracelet 1000 is operable to assert its ability to timeout using the watchdog or similar mechanism. In this example, the identity bracelet 1000 is operable to store charge to remain powered for a limited time period.

Figure 11:
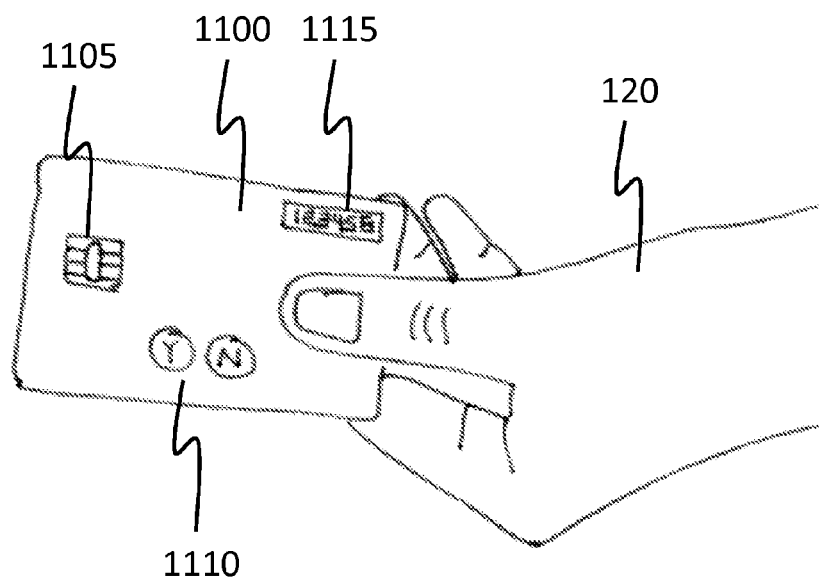
FIG. 11 shows a schematic representation of another example of an authentication device in accordance with an embodiment of the present invention.

Referring to FIG. 11, there is shown schematically another example of an authentication device. In this example, the authentication device is in the form of an identity card 1100. In this example, the identity card 1100 also includes a contact interface 1105. In a specific example, the identity card 1100 is operable to communicate via the contact interface 1105. In a specific example, the identity card 1100 is also powered via the contact interface when the identity card 1105 is inserted into a powered card reader.

In this example, the identity card 1100 includes a Yes/No response keypad 1110. The identity card 1100 includes the confirmation component 230, which receives user input via the Yes/No response keypad 110 and interprets the user input as indicating a Yes or No response to a confirmation request. The identity card 1100 is operable to assert its ability to indicate a Yes or No response to a confirmation request.

In this example, the identity card 1100 includes a display 1115. The display 1115 is used to display information, for example to the user 120.

In this example, the identity card 1100 includes a biometric fingerprint reader (not visible). The identity card 1100 is operable to read biometric information of the user 120 via the biometric reader. The identity card 1100 is operable to assert its ability to read biometric information of the user 120.

In this example, the identity card 1100 includes the duress component 235. Duress may be detected, for example, where the user 120 indicates that they are authenticating under duress by providing a fingerprint from a particular one of their fingers. The identity card 1100 is operable to assert its ability to indicate whether the identity of the user 120 is being authenticated under duress.

In this example, the identity card 1100 includes a real-time clock (not visible), which is powered by a stored charge. In this example, the identity card 1100 includes the ability to timeout using the watchdog or similar mechanism. The identity card 1100 is operable to assert its ability to timeout using the watchdog or similar mechanism.

Figure 12:
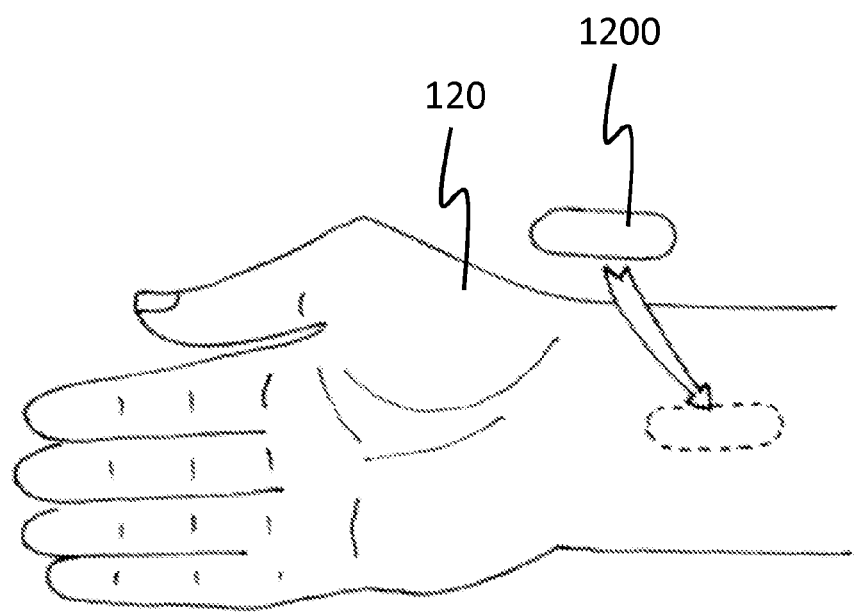
FIG. 12 shows a schematic representation of another example of an authentication device in accordance with an embodiment of the present invention.

Referring to FIG. 12, there is shown schematically another example of an authentication device. In this example, the authentication device is in the form of an identity chip 1200. In this specific example, the identity chip 1200 is embedded under the skin of the user 120, as indicated by broken lines in FIG. 12. There are various ways in which the identity chip 1200 may be embedded under the skin of the user 120. For example, the identity chip 1200 may be injected under the skin of the user 120. The identity chip 1200 may be inserted under the skin of the user 120 in another way.

In this example, the identity chip 1200 includes a biometric reader (not visible). The identity chip 1200 is operable to read biometric information of the user 120 via the biometric reader. In this specific example, the identity chip 1200 is operable to read DNA and/or biorhythm information of the user. The identity chip 1200 is operable to assert its ability to read biometric information of the user 120.

In this example, the identity chip 1200 includes the confirmation component 230. The confirmation component 230 receives user input based on capacitive feedback when the user 120 touches their skin. The confirmation component 230 interprets a predetermined skin touch by the user input as indicating a Yes or No response to a confirmation request. The identity chip 1200 is operable to assert its ability to indicate a Yes or No response to a confirmation request.

In this example, the identity chip 1200 includes the duress component 235. Duress may be detected, for example, where the user 120 indicates that they are authenticating under duress based on capacitive feedback when the user 120 touches their skin. The identity chip 1200 is operable to assert its ability to indicate whether the identity of the user 120 is being authenticated under duress.

Various different power sources for the identity chip 1200 are envisaged. In one example, the identity chip 1200 is powered by the body heat of the user 120. In another example, the identity chip 1200 is powered by movement of the user 120. In another example, the identity chip 1200 is powered by induction of power from an external source (not shown). In another example, the identity chip 1200 is powered by harvesting power from radio waves emitted by an external source (not shown). Various combinations of these power sources may be used.

In this example, the identity chip 1200 includes a real-time clock (not shown), which is powered by a stored charge. In this example, the identity card 1100 includes the ability to timeout using the watchdog or similar mechanism. The identity chip 1200 is operable to assert its ability to timeout using the watchdog or similar mechanism. In this example, the identity chip 1200 is operable to store charge to remain powered for a limited time period.

In this example, the identity chip 1200 is operable to detect death of the user 120. The identity chip 1200 may be able to infer death of the user 120 and/or removal of the identity chip 1200 from the user 120 in the absence of biological information feedback from the user 120. For example, the identity chip 1200 may infer death and/or removal if the identity chip 1200 does not detect a heartbeat pattern from the user 120. The identity chip 1200 is operable to assert its ability to detect death of and/or removal from the user 120.

Figure 13:
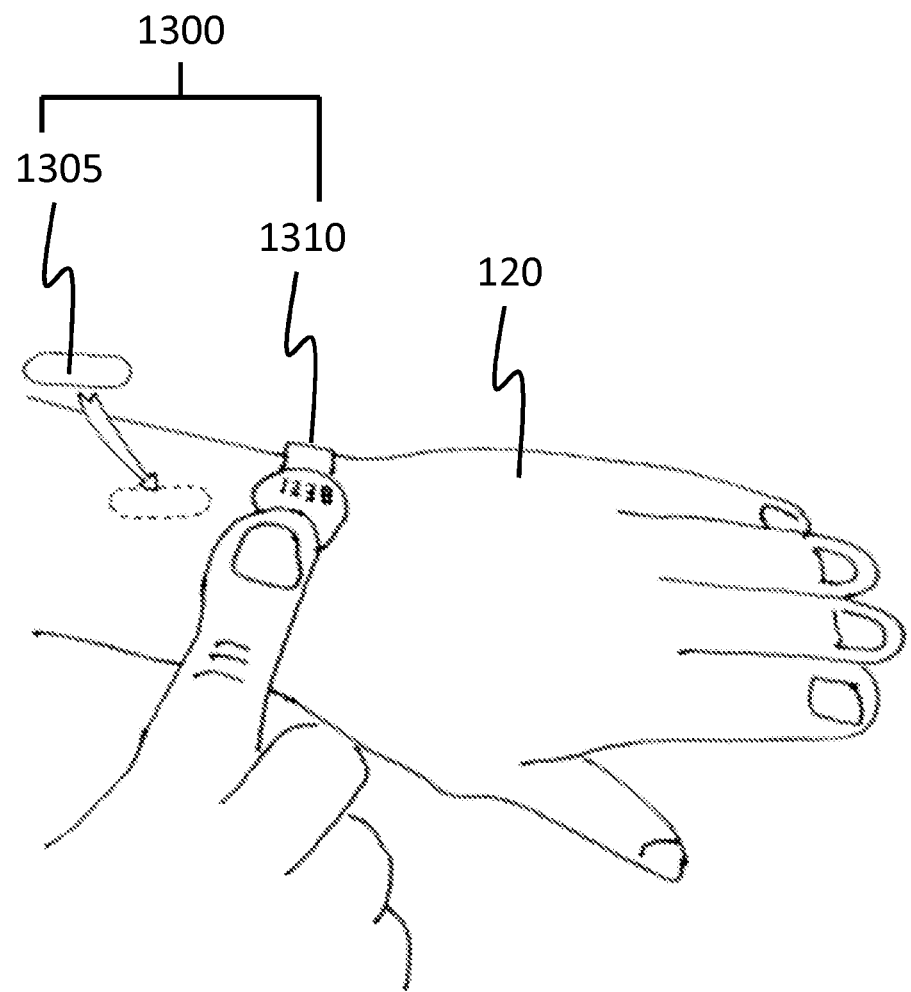
FIG. 13 shows a schematic representation of another example of an authentication device in accordance with an embodiment of the present invention.

Referring to FIG. 13, there is shown schematically another example of an authentication device. In this example, the authentication device includes a chip component 1300 and an identity bracelet component 1305. The chip component 1300 is paired with the identity bracelet component 1305 in the sense that, together, the chip component 1300 and the identity bracelet component 1305 make up the authentication device. The chip component 1300 is embedded under the skin of the user 120. The identity bracelet component 1305 may conveniently be worn on the wrist of the user 120.

In this specific example, the chip component 1300 includes the identity binding store 220. In this specific example, the identity chip component 1300 also includes the cryptographic store 225. The identity bracelet component 1305 is able to access data stored in the identity binding store 220 and the cryptographic store 225. In this specific example, the chip component 1300 does not include, for example, a biometric reader. However, in other examples, the chip component 1300 could include a biometric reader.

Distributing the components of the authentication device 110 in this way may be beneficial where there is a relatively high risk of the identity bracelet component 1305 being lost or stolen and a relatively low risk of the identity chip component 1300 being lost or stolen.

Distributing the components of the authentication device 110 in this way may be beneficial where the user 120 may wish to upgrade their authentication device without the need to regenerate their cryptographic keys or re-link a new device to all of their existing persona.

In this example, the identity bracelet component 1305 includes a touch-sensitive user interface 1310. The identity bracelet component 1305 includes the confirmation component 230, which receives user input via the touch-sensitive user interface 1310 and interprets the user input as indicating a Yes or No response to a confirmation request. The identity bracelet component 1305 is operable to indicate the Yes or No response to the confirmation request to the authentication result generator 200. The identity bracelet component 1305 is operable to assert its ability to indicate a Yes or No response.

In this example, the identity bracelet component 1305 includes a biometric reader 1320. The identity bracelet component 1305 is operable to read biometric information of the user 120 via the biometric reader 1320. In this specific example, the identity bracelet component 1305 is operable to assert its ability to read biometric information of the user 120.

In this example, the identity bracelet component 1305 includes the duress component 235. Duress may be detected, for example, where the user 120 can indicate that they are authenticating under duress by providing a fingerprint from a particular one of their fingers. The identity bracelet component 1305 is operable to assert its ability to indicate whether the identity of the user 120 is being authenticated under duress.

In this example, identity bracelet component 1305 includes a display 1325. The display 1325 is used to display information, for example to the user 120.

In this example, the identity bracelet component 1305 includes a real-time clock (not visible), which is powered by a stored charge. In this example, the identity bracelet component 1305 includes the ability to timeout using the watchdog or similar mechanism. The identity bracelet component 1305 is operable to assert its ability to timeout using the watchdog or similar mechanism. In this example, the identity bracelet component 1305 is operable to store charge to remain powered for a limited time period.

The above embodiments are to be understood as illustrative examples of the invention. Further embodiments of the invention are envisaged.

In some examples described above, one or more identities of the user are bound to the authentication device 110. In other examples, the authentication device 110 may not have binding capabilities itself and may be used solely for authentication of the identity of the user 120.

In the examples described above, the authentication device 110 is used to authenticate one or more persona of the user 120. For example, a corporate persona of the user 120 may be stored on a mobile telephone belonging to the user 120 and the authentication device 110, which is different from the mobile telephone in this example, is used to authenticate the user 120 as the entity currently holding that mobile telephone. This may allow, for example, the holder of the mobile telephone to be used to gain access to a room or building, where the mobile telephone by itself (in the hands of a non-authorized entity) would fail to gain access. In a specific example, the authentication device 110 communicates with the mobile telephone to determine which personas stored within the phone are valid within the authentication device 110. In other words, the authentication device 110 communicates with the mobile telephone to determine which personas stored within the mobile telephone have been linked to the authentication device 110. In an example, the mobile telephone stores personas relating to multiple users. For example, a mobile telephone may be used by all members of a family, each family member having one or more of their own personas stored on the mobile telephone. One family member may have, say, a personal and corporate persona stored on the mobile telephone. That user can use the mobile telephone to make calls, view their corporate contacts and also access their personal and corporate e-mails. Another family member has their own personal persona stored on the mobile telephone and can view their own personal contacts and access their own personal e-mails.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An authentication device constructed and arranged to authenticate an entity for use by a relying party, wherein the authentication device includes at least one processor and at least one memory, the authentication device being arranged to:
    select at least one persona of the entity from a plurality of different personas, wherein the entity is local to the authentication device, wherein the local entity has the plurality of different personas, and wherein the at least one persona in the plurality of different personas is associated with one or more attributes of the local entity;
    authenticate an identity of the local entity using at least one authentication process, wherein the authenticating of the identity of the local entity is performed in relation to the selected at least one persona of the local entity;
    cause an authentication result to be indicated for use by the relying party, the authentication result identifying at least the identity of the local entity and the at least one authentication process used to authenticate the identity of the local entity;
    in response to receiving a request for additional authentication of the identity of the local entity to be carried out, re-authenticate the identity of the local entity using at least one additional authentication process or request a real-time authentication of the identity of the local entity; and
    cause an additional authentication result to be indicated for use by the relying party, the additional authentication result identifying a result of the additional authentication, to enable the relying party to use authentication processes of the authentication device to make a risk-based decision on the authentication performed by the authentication device, wherein the authentication device is arranged to use both the at least one authentication process and the at least one additional authentication process.

2. The authentication device of claim 1, the authentication device being arranged to cause the authentication result to be indicated to an intermediary, the intermediary being intermediate the authentication device and the relying party and being arranged to indicate data relating to the local entity to the relying party dependent on the authentication result.

3. The authentication device of claim 1, the authentication device being arranged to cause data identifying one or more attributes associated with the authentication device to be indicated, wherein the one or more attributes associated with the authentication device comprise one or more of:
    an issuer of the authentication device;
    a manufacturer of the authentication device;
    a model of the authentication device;
    capability of the authentication device to perform one or more authentication processes;
    capability of the authentication device to perform one or more functions associated with authentication; and
    capability of the authentication device to indicate whether the identity of the local entity is being authenticated under duress.

4. The authentication device of claim 1, the authentication device being arranged to store a link between the local entity and the plurality of different personas in the authentication device.

5. The authentication device of claim 1, the authentication device being arranged to:
    compare one or more received authentication credentials with pre-stored authentication data associated with the identity of the local entity;
    determine a result of the authentication based at least in part on said comparing; and
    cause the result of the authentication to be indicated based at least in part on said comparing.

6. The authentication device of claim 1, the authentication device being arranged to select the at least one authentication process used to authenticate the identity of the local entity based at least in part on authentication process selection data received from the local entity or based at least in part on authentication process selection data received from the relying party.

7. A method of authenticating an entity for use by a relying party, the method comprising:
    selecting, at an authentication device, at least one persona of the entity from a plurality of different personas, wherein the authentication device includes at least one processor and at least one memory, wherein the entity is local to the authentication device, wherein the local entity has a plurality of different personas, and wherein the at least one persona in the plurality of different personas is associated with one or more attributes of the local entity;

authenticating an identity of the local entity using at least one authentication process, wherein the authenticating of the identity of the local entity is performed in relation to the selected at least one persona of the local entity;

causing an authentication result to be indicated for use by the relying party, the authentication result identifying at least the identity of the local entity and the at least one authentication process used to authenticate the identity of the local entity;

in response to receiving a request for additional authentication of the identity of the local entity to be carried out, re-authenticating the identity of the local entity using at least one additional authentication process or requesting a real-time authentication of the identity of the local entity; and causing an additional authentication result to be indicated for use by the relying party, the additional authentication result identifying a result of the additional authentication, to enable the relying party to use authentication processes of the authentication device to make a risk-based decision on the authentication performed by the authentication device, wherein the authentication device is arranged to use both the at least one authentication process and the at least one additional authentication process.

8. The method of claim 7, wherein said causing the authentication result to be indicated comprises causing the authentication result to be indicated to an intermediary, the intermediary being intermediate the authentication device and the relying party and being arranged to indicate data relating to the local entity to the relying party dependent on the authentication result.

9. The method of claim 7, comprising causing data identifying one or more attributes associated with the authentication device to be indicated, wherein the one or more attributes associated with the authentication device comprise one or more of:
   an issuer of the authentication device;
   a manufacturer of the authentication device;
   a model of the authentication device;
   capability of the authentication device to perform one or more authentication processes;
   capability of the authentication device to perform one or more functions associated with authentication; and
   capability of the authentication device to indicate whether the identity of the local entity is being authenticated under duress.

10. The method of claim 7, the method comprising storing a link between the local entity and the plurality of different personas in the authentication device.

11. The method of claim 7, comprising:
   receiving one or more authentication credentials for use in said authenticating;
   comparing the received one or more authentication credentials with pre-stored authentication data associated with the identity of the local entity;
   determining a result of the authentication based at least in part on said comparing; and
   causing the result of the authentication to be indicated based at least in part on said comparing.

12. The method of claim 7, comprising selecting the at least one authentication process used to authenticate the identity of the local entity based at least in part on authentication process selection data received from the local entity or based at least in part on authentication process selection data received from the relying party.

13. A method for use by a relying party in authenticating an entity, the method comprising:
   receiving an authentication result identifying at least an identity of the entity and at least one authentication process used to authenticate the identity of the entity at an authentication device,
      wherein the entity is local to the authentication device,
      wherein the local entity has a plurality of different personas,
      wherein at least one persona in the plurality of different personas is associated with one or more attributes of the local entity,
      wherein the authentication device includes at least one processor and at least one memory, and wherein the authentication device is arranged to
         select the at least one persona from the plurality of different personas, and
         perform said authenticating of the identity of the local entity in relation to the selected at least one persona of the local entity;
   determining whether or not to accept an authentication of the identity of the local entity by the authentication device based at least in part on the identified at least one authentication process used by the authentication device to authenticate the identity of the local entity;
   sending, based on the determination, a request for additional authentication of the identity of the local entity to be carried out, using at least one additional authentication process or a real-time authentication of the identity of the local entity; and
   receiving an additional authentication result identifying a result of the additional authentication, to enable the relying party to use authentication processes of the authentication device to make a risk-based decision on the authentication performed by the authentication device, wherein the authentication device is arranged to use both the at least one authentication process and the at least one additional authentication process.

14. A device constructed and arranged to be used by a relying party in authenticating an entity, the device being arranged to:
   identify, from an authentication result received from an authentication device, at least an identity of the entity and at least one authentication process used to authenticate the identity of the entity at the authentication device,
      wherein the entity is local to the authentication device,
      wherein the local entity has a plurality of different personas,
      wherein at least one persona in the plurality of different personas is associated with one or more attributes of the local entity,
      wherein the authentication device includes at least one processor and at least one memory, and wherein the authentication device is arranged to
         select the at least one persona from the plurality of different personas, and
         perform said authenticating of the identity of the local entity in relation to the selected at least one persona of the local entity;

determine whether or not to accept an authentication of the identity of the local entity by the authentication device based at least in part on the identified at least one authentication process used by the authentication device to authenticate the identity of the local entity;
send, based on the determination, a request for additional authentication of the identity of the local entity to be carried out, using at least one additional authentication process or a real-time authentication of the identity of the local entity; and
receive an additional authentication result identifying a result of the additional authentication, to enable the relying party to use authentication processes of the authentication device to make a risk-based decision on the authentication performed by the authentication device, wherein the authentication device is arranged to use both the at least one authentication process and the at least one additional authentication process.

15. A method of setting up an authentication device for use in authenticating an entity, the method comprising:
initializing the authentication device by creating and storing a binding between the entity and the authentication device, wherein the authentication device includes at least one processor and at least one memory, wherein the entity has a plurality of different digital personas, and wherein a digital persona in the plurality of different digital personas is associated with one or more attributes of the entity;
storing a set of cryptographic keys in the authentication device;
binding the authentication device to the digital persona for the entity by creating a link in the authentication device between the digital persona and the entity, whereby the authentication device is arranged to cause an authentication result to be indicated for use by a relying party, the authentication result identifying at least the identity of the entity and at least one authentication process used to authenticate the identity of the entity in relation to the digital persona;
creating a link to the digital persona; and
storing the link to the digital persona in the authentication device,
wherein the authentication device is arranged to select at least one digital persona of the entity from the plurality of different digital personas and authenticate an identity of the entity when the entity is local to the authentication device and in relation to the selected at least one digital persona of the entity.

16. Apparatus constructed and arranged to set up an authentication device for use in authenticating an entity, the apparatus being arranged to:
initialize the authentication device by creating and storing a binding between the entity and the authentication device, wherein the authentication device includes at least one processor and at least one memory, and wherein the entity has a plurality of different personas, and wherein a persona is associated with one or more attributes of the entity;
store a set of cryptographic keys in the authentication device;
binding the authentication device to a digital persona for the entity by creating a link in the authentication device between the digital persona and the entity, whereby the authentication device is arranged to cause an authentication result to be indicated for use by a relying party, the authentication result identifying at least the identity of the entity and at least one authentication process used to authenticate the identity of the entity in relation to the digital persona;
creating a link to the digital persona; and
storing the link to the digital persona in the authentication device,
wherein the authentication device is arranged to select at least one persona of the entity from the plurality of different personas and authenticate an identity of the entity when the entity is local to the authentication device and in relation to the selected at least one persona of the entity.

17. The authentication device of claim 1, the authentication device being arranged to cause the transmission, over a telecommunications network, of the authentication result from the authentication device to the relying party.

* * * * *